United States Patent
Gardner et al.

(10) Patent No.: US 8,064,409 B1
(45) Date of Patent: Nov. 22, 2011

(54) METHOD AND APPARATUS USING A MULTI-CARRIER FORWARD LINK IN A WIRELESS COMMUNICATION SYSTEM

(75) Inventors: William R. Gardner, San Diego, CA (US); Edward G. Tiedemann, Jr., San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/382,438

(22) Filed: Aug. 25, 1999

(51) Int. Cl.
*H04J 13/00* (2006.01)
(52) U.S. Cl. ........................... 370/335; 370/342
(58) Field of Classification Search .............. 370/335, 370/337, 342, 374, 348, 321, 330, 465, 468, 370/464, 311, 343, 322, 441, 442, 443, 444; 375/200, 825.08
See application file for complete search history.

(56) References Cited

U.S. PATENT DOCUMENTS

| | | | |
|---|---|---|---|
| 3,018,663 A | 1/1962 | Dunlop | |
| 3,534,264 A | 10/1970 | Blasbalg et al. | |
| 4,047,151 A | 9/1977 | Rydbeck et al. | |
| 4,256,925 A | 3/1981 | Goode | |
| 4,261,054 A | 4/1981 | Scharla-Nielsen | |
| 4,309,764 A | 1/1982 | Acampora et al. | |
| 4,383,315 A | 5/1983 | Torng | |
| 4,491,947 A | 1/1985 | Frank | |
| 4,495,619 A | 1/1985 | Acampora | |
| 4,495,648 A | 1/1985 | Giger | |
| 4,547,880 A | 10/1985 | De Vita et al. | |
| 4,675,863 A | 6/1987 | Paneth et al. | |
| 4,720,829 A | 1/1988 | Fukasawa et al. | |
| 4,756,007 A | 7/1988 | Qureshi et al. | |
| 4,785,450 A | 11/1988 | Bolgiano et al. | |
| 4,789,983 A | 12/1988 | Acampora et al. | |
| 4,817,089 A | 3/1989 | Paneth et al. | |
| 4,901,307 A | 2/1990 | Gilhousen et al. | |
| 4,901,319 A | 2/1990 | Ross | |
| 4,910,794 A | 3/1990 | Mahany | |
| 4,914,651 A | 4/1990 | Lusignan | |
| 4,931,250 A | 6/1990 | Greszczuk | |
| 4,939,731 A | 7/1990 | Reed et al. | |
| 4,991,184 A | 2/1991 | Hashimoto | |
| 5,003,534 A | 3/1991 | Gerhardt et al. | |
| 5,022,046 A | 6/1991 | Morrow, Jr. | |

(Continued)

FOREIGN PATENT DOCUMENTS

CA 2427007 6/2002

(Continued)

OTHER PUBLICATIONS

Shinsuke Hara & Ramjee Prasad, Overview of Multicarrier CDMA, IEEE Comm. Mag., Dec. 1997, at 126.*

(Continued)

*Primary Examiner* — Melvin Marcelo
(74) *Attorney, Agent, or Firm* — Rupit M. Patel

(57) ABSTRACT

A method and apparatus that allows a telecommunications system using cdma2000 1× to easily migrate to using cdma2000 3×. In other embodiments, the invention provides for better spectrum management, allows concurrent usage of a standard cdma2000 1× reverse link with a cdma2000 1× time-division-duplexing (TDD) reverse link, and provides for hardware supplementation—as opposed to total replacement—when additional services are added to an existing code-division-multiple-access (CDMA) system.

35 Claims, 10 Drawing Sheets

U.S. PATENT DOCUMENTS

| | | | |
|---|---|---|---|
| 5,038,399 A | | 8/1991 | Bruckert |
| 5,056,109 A | * | 10/1991 | Gilhousen et al. ............ 370/311 |
| 5,093,924 A | | 3/1992 | Toshiyuki et al. |
| 5,101,501 A | | 3/1992 | Gilhousen et al. |
| 5,103,459 A | | 4/1992 | Gilhousen et al. ................ 375/1 |
| 5,115,429 A | | 5/1992 | Hluchyj et al. |
| 5,191,583 A | | 3/1993 | Pearson et al. |
| 5,204,876 A | | 4/1993 | Bruckert et al. |
| 5,235,614 A | | 8/1993 | Bruckert et al. |
| 5,267,261 A | | 11/1993 | Blakeney, II et al. |
| 5,267,262 A | | 11/1993 | Wheatley, III |
| 5,276,261 A | | 1/1994 | Mayer et al. |
| 5,280,537 A | | 1/1994 | Sugiyama et al. |
| 5,289,527 A | | 2/1994 | Tiedemann, Jr. |
| 5,297,192 A | | 3/1994 | Gerszberg |
| 5,305,308 A | | 4/1994 | English et al. |
| 5,317,123 A | | 5/1994 | Ito et al. |
| 5,373,502 A | | 12/1994 | Turban |
| 5,375,123 A | | 12/1994 | Andersson et al. |
| 5,383,219 A | | 1/1995 | Wheatley, III et al. |
| 5,386,589 A | | 1/1995 | Kanai |
| 5,396,516 A | | 3/1995 | Padovani et al. |
| 5,400,328 A | | 3/1995 | Burren et al. |
| 5,404,376 A | | 4/1995 | Dent |
| 5,412,687 A | | 5/1995 | Sutton et al. |
| 5,414,796 A | | 5/1995 | Jacobs et al. ................... 395/2.3 |
| 5,416,797 A | | 5/1995 | Gilhousen et al. |
| 5,425,051 A | | 6/1995 | Mahany |
| 5,434,860 A | | 7/1995 | Riddle |
| 5,442,625 A | * | 8/1995 | Gitlin et al. ................... 370/342 |
| 5,461,639 A | | 10/1995 | Wheatley, III et al. |
| 5,465,388 A | | 11/1995 | Zicker |
| 5,469,471 A | | 11/1995 | Wheatley, III et al. |
| 5,485,486 A | | 1/1996 | Gilhousen et al. |
| 5,491,837 A | | 2/1996 | Haartsen |
| 5,497,395 A | | 3/1996 | Jou et al. |
| 5,504,773 A | | 4/1996 | Padovani et al. |
| 5,528,593 A | | 6/1996 | English et al. |
| 5,530,693 A | | 6/1996 | Averbuch et al. |
| 5,530,700 A | | 6/1996 | Tran et al. |
| 5,533,004 A | | 7/1996 | Jasper et al. |
| 5,535,239 A | | 7/1996 | Padovani et al. |
| 5,537,410 A | | 7/1996 | Li |
| 5,564,080 A | | 10/1996 | Eul et al. |
| 5,566,175 A | | 10/1996 | Davis |
| 5,568,483 A | | 10/1996 | Padovani et al. |
| 5,577,087 A | | 11/1996 | Furuya |
| 5,579,306 A | | 11/1996 | Dent |
| 5,594,720 A | | 1/1997 | Papadopoulos et al. |
| 5,594,949 A | | 1/1997 | Andersson et al. |
| 5,603,093 A | | 2/1997 | Yoshimi et al. |
| 5,604,730 A | * | 2/1997 | Tiedemann, Jr. ............. 370/252 |
| 5,612,948 A | | 3/1997 | Fette et al. |
| 5,621,723 A | * | 4/1997 | Walton et al. ................. 370/335 |
| 5,621,752 A | | 4/1997 | Antonio et al. |
| 5,634,195 A | | 5/1997 | Sawyer |
| 5,638,412 A | | 6/1997 | Blakeney, II et al. |
| 5,648,955 A | * | 7/1997 | Jensen et al. ................... 370/252 |
| 5,649,290 A | | 7/1997 | Wang et al. |
| 5,654,979 A | | 8/1997 | Levin et al. |
| 5,666,649 A | | 9/1997 | Dent |
| 5,680,395 A | | 10/1997 | Weaver et al. |
| 5,682,605 A | | 10/1997 | Salter |
| 5,697,053 A | | 12/1997 | Hanly et al. |
| 5,699,365 A | | 12/1997 | Klayman et al. |
| 5,701,294 A | | 12/1997 | Ward et al. |
| 5,710,768 A | | 1/1998 | Ziv et al. |
| 5,710,974 A | | 1/1998 | Granlund et al. |
| 5,726,978 A | | 3/1998 | Frodigh et al. |
| 5,729,557 A | | 3/1998 | Gardner et al. |
| 5,734,646 A | | 3/1998 | I et al. |
| 5,734,647 A | | 3/1998 | Yoshida et al. |
| 5,745,480 A | | 4/1998 | Behtash et al. |
| 5,748,677 A | | 5/1998 | Kumar |
| 5,751,725 A | | 5/1998 | Chen |
| 5,757,810 A | | 5/1998 | Fall |
| 5,764,687 A | | 6/1998 | Easton |
| 5,764,699 A | | 6/1998 | Needham et al. |
| 5,764,899 A | | 6/1998 | Eggleston et al. |
| 5,771,226 A | | 6/1998 | Kaku et al. |
| 5,771,451 A | | 6/1998 | Takai et al. |
| 5,771,461 A | | 6/1998 | Love et al. |
| 5,774,809 A | | 6/1998 | Tuutijarvi et al. |
| 5,781,539 A | | 7/1998 | Tanaka |
| 5,781,583 A | | 7/1998 | Bruckert et al. |
| 5,787,133 A | | 7/1998 | Marchetto et al. |
| 5,793,759 A | * | 8/1998 | Rakib et al. ................... 370/342 |
| 5,799,005 A | | 8/1998 | Soliman |
| 5,802,046 A | | 9/1998 | Logan |
| 5,805,581 A | | 9/1998 | Uchida et al. |
| 5,805,585 A | | 9/1998 | Javitt et al. |
| 5,812,938 A | | 9/1998 | Gilhousen et al. |
| 5,822,315 A | | 10/1998 | De Seze et al. |
| 5,822,318 A | | 10/1998 | Tiedemann, Jr. et al. |
| 5,822,358 A | | 10/1998 | Johansen et al. |
| 5,822,359 A | | 10/1998 | Bruckert et al. |
| 5,825,761 A | | 10/1998 | Tanaka et al. |
| 5,832,368 A | | 11/1998 | Nakano et al. |
| 5,835,508 A | | 11/1998 | Kushita |
| 5,842,113 A | | 11/1998 | Nanda et al. |
| 5,845,212 A | | 12/1998 | Tanaka et al. |
| 5,848,357 A | | 12/1998 | Dehner |
| 5,850,605 A | | 12/1998 | Souissi et al. |
| 5,857,147 A | | 1/1999 | Gardner et al. |
| 5,862,132 A | | 1/1999 | Blanchard et al. |
| 5,862,453 A | | 1/1999 | Love et al. |
| 5,870,393 A | | 2/1999 | Yano et al. |
| 5,872,775 A | | 2/1999 | Saints et al. |
| 5,878,038 A | | 3/1999 | Willey |
| 5,896,561 A | | 4/1999 | Schrader et al. |
| 5,901,142 A | | 5/1999 | Averbuch et al. |
| 5,903,554 A | | 5/1999 | Saints |
| 5,914,950 A | | 6/1999 | Tiedemann, Jr. et al. |
| 5,914,959 A | | 6/1999 | Marchetto et al. |
| 5,918,184 A | | 6/1999 | Wang et al. |
| 5,920,551 A | | 7/1999 | Na et al. |
| 5,923,650 A | | 7/1999 | Chen et al. |
| 5,930,288 A | | 7/1999 | Eberhardt |
| 5,933,421 A | | 8/1999 | Alamouti et al. |
| 5,933,462 A | | 8/1999 | Viterbi et al. |
| 5,933,787 A | | 8/1999 | Gilhousen et al. |
| 5,937,002 A | | 8/1999 | Andersson et al. |
| 5,937,357 A | | 8/1999 | Tanaka |
| 5,940,765 A | | 8/1999 | Haartsen |
| 5,943,327 A | | 8/1999 | Mademann et al. |
| 5,946,346 A | | 8/1999 | Ahmed et al. |
| 5,946,356 A | | 8/1999 | Felix et al. |
| 5,946,621 A | | 8/1999 | Chheda et al. |
| 5,950,124 A | | 9/1999 | Trompower et al. |
| 5,953,325 A | | 9/1999 | Willars |
| 5,956,642 A | | 9/1999 | Larsson |
| 5,960,350 A | | 9/1999 | Schorman et al. |
| 5,963,548 A | * | 10/1999 | Virtanen ....................... 370/335 |
| 5,966,384 A | | 10/1999 | Felix et al. |
| 5,974,106 A | | 10/1999 | Dupont |
| 5,978,657 A | | 11/1999 | Suzuki |
| 5,991,627 A | | 11/1999 | Honkasalo et al. |
| 6,002,919 A | | 12/1999 | Posti |
| 6,005,856 A | | 12/1999 | Jensen et al. |
| 6,028,852 A | | 2/2000 | Miya et al. |
| 6,052,594 A | | 4/2000 | Chuang et al. |
| 6,067,324 A | | 5/2000 | Harrison |
| 6,069,884 A | | 5/2000 | Hayashi et al. |
| 6,073,025 A | | 6/2000 | Chheda et al. |
| 6,088,324 A | | 7/2000 | Sato |
| 6,088,335 A | | 7/2000 | I et al. |
| 6,091,737 A | | 7/2000 | Hong et al. |
| 6,091,757 A | | 7/2000 | Cudak et al. |
| 6,097,704 A | | 8/2000 | Jackson et al. |
| 6,101,394 A | * | 8/2000 | Illidge ........................... 455/466 |
| 6,134,220 A | | 10/2000 | Le Strat et al. |
| 6,137,789 A | | 10/2000 | Honkasalo et al. |
| 6,137,839 A | | 10/2000 | Mannering et al. |
| 6,137,991 A | | 10/2000 | Isaksson |
| 6,151,502 A | | 11/2000 | Padovani et al. |
| 6,161,013 A | | 12/2000 | Anderson et al. |
| 6,163,707 A | | 12/2000 | Miller |

| | | |
|---|---|---|
| 6,167,031 A | 12/2000 | Olofsson et al. |
| 6,173,005 B1 | 1/2001 | Kotzin et al. |
| 6,173,007 B1* | 1/2001 | Odenwalder et al. ......... 370/342 |
| 6,174,558 B1 | 1/2001 | Lamptey |
| 6,175,448 B1 | 1/2001 | Xie et al. |
| 6,175,550 B1* | 1/2001 | van Nee ....................... 370/206 |
| 6,175,558 B1 | 1/2001 | Miya |
| 6,175,590 B1 | 1/2001 | Stein |
| 6,178,448 B1 | 1/2001 | Gray et al. |
| 6,179,007 B1 | 1/2001 | Cote et al. |
| 6,188,906 B1 | 2/2001 | Lim et al. |
| 6,189,122 B1 | 2/2001 | Cheng |
| 6,212,176 B1 | 4/2001 | Andersson et al. |
| 6,212,988 B1 | 4/2001 | Chernyshov et al. |
| 6,215,988 B1 | 4/2001 | Matero |
| 6,219,343 B1 | 4/2001 | Honkasalo et al. |
| 6,222,832 B1* | 4/2001 | Proctor ....................... 370/335 |
| 6,222,875 B1 | 4/2001 | Dahlman et al. |
| 6,233,231 B1 | 5/2001 | Felix et al. |
| 6,236,365 B1 | 5/2001 | Le Blanc et al. |
| 6,263,205 B1 | 7/2001 | Yamaura et al. |
| 6,266,339 B1 | 7/2001 | Donahue et al. |
| 6,272,124 B1 | 8/2001 | Ahn et al. |
| 6,285,655 B1 | 9/2001 | Lundby et al. |
| 6,285,886 B1 | 9/2001 | Kamel et al. |
| 6,307,844 B1 | 10/2001 | Tsunehara et al. |
| 6,307,851 B1* | 10/2001 | Jung et al. ..................... 370/342 |
| 6,308,072 B1 | 10/2001 | Labedz et al. |
| 6,317,413 B1* | 11/2001 | Honkasalo .................... 370/209 |
| 6,317,435 B1 | 11/2001 | Tiedemann, Jr. et al. |
| 6,320,851 B1* | 11/2001 | Kim et al. .................... 370/320 |
| 6,335,922 B1* | 1/2002 | Tiedemann et al. .......... 370/335 |
| 6,347,217 B1 | 2/2002 | Bengtsson et al. |
| 6,356,555 B1 | 3/2002 | Rakib et al. |
| 6,366,778 B1 | 4/2002 | Bender et al. |
| 6,377,809 B1 | 4/2002 | Rezaiifar et al. |
| 6,389,066 B1 | 5/2002 | Ejzak et al. |
| 6,393,005 B1 | 5/2002 | Mimura |
| 6,400,695 B1 | 6/2002 | Chuah et al. |
| 6,434,367 B1 | 8/2002 | Kumar et al. |
| 6,434,380 B1 | 8/2002 | Andersson et al. |
| 6,434,637 B1 | 8/2002 | D'Errico et al. |
| 6,438,115 B1 | 8/2002 | Mazur et al. |
| 6,445,908 B1 | 9/2002 | Glazko |
| 6,456,652 B1 | 9/2002 | Kim et al. |
| 6,470,024 B1 | 10/2002 | Hamalainen et al. |
| 6,470,044 B1 | 10/2002 | Kowalski |
| 6,483,825 B2 | 11/2002 | Seta |
| 6,496,543 B1 | 12/2002 | Zehavi |
| 6,501,958 B1 | 12/2002 | Hwang et al. |
| 6,512,925 B1 | 1/2003 | Chen et al. |
| 6,545,986 B1 | 4/2003 | Stellakis |
| 6,563,809 B1 | 5/2003 | Proctor et al. |
| 6,567,374 B1 | 5/2003 | Bohnke et al. |
| 6,567,461 B1 | 5/2003 | Moon et al. |
| 6,570,860 B2 | 5/2003 | Hamalainen et al. |
| 6,574,211 B2 | 6/2003 | Padovani et al. |
| 6,574,266 B1 | 6/2003 | Haartsen |
| 6,574,267 B1 | 6/2003 | Kanterakis et al. |
| 6,577,618 B2 | 6/2003 | Diachina et al. |
| 6,580,899 B1 | 6/2003 | Dalgleish et al. |
| 6,590,873 B1 | 7/2003 | Li et al. |
| 6,606,311 B1* | 8/2003 | Wang et al. .................... 370/338 |
| 6,615,052 B1 | 9/2003 | Parmenter |
| 6,621,804 B1 | 9/2003 | Holtzman et al. |
| 6,625,433 B1 | 9/2003 | Poirier et al. |
| 6,636,496 B1 | 10/2003 | Cho et al. |
| 6,643,520 B1 | 11/2003 | Kim et al. |
| 6,668,159 B1 | 12/2003 | Olofsson et al. |
| 6,711,150 B1 | 3/2004 | Vanghi et al. |
| 6,711,415 B1 | 3/2004 | McCarthy |
| 6,717,926 B1 | 4/2004 | Deboille et al. |
| 6,725,043 B2 | 4/2004 | Bonta et al. |
| 6,728,233 B1 | 4/2004 | Park et al. |
| 6,757,270 B1 | 6/2004 | Kumar et al. |
| 6,804,214 B1* | 10/2004 | Lundh et al. ................ 370/335 |
| 6,810,030 B1* | 10/2004 | Kuo ............................. 370/335 |
| 6,834,047 B1 | 12/2004 | Yoon et al. |
| 6,859,446 B1 | 2/2005 | Gopalakrishnan et al. |
| 6,894,994 B1 | 5/2005 | Grob |
| 6,898,437 B1 | 5/2005 | Larsen et al. |
| 6,912,228 B1 | 6/2005 | Dahlman et al. |
| 6,917,808 B1 | 7/2005 | Nelson |
| 6,971,098 B2 | 11/2005 | Khare et al. |
| 6,973,062 B1 | 12/2005 | Han |
| 6,973,098 B1 | 12/2005 | Lundby et al. |
| 7,002,920 B1 | 2/2006 | Ayyagari et al. |
| 7,016,649 B1 | 3/2006 | Narasimhan et al. |
| 7,068,683 B1 | 6/2006 | Lundby et al. |
| 7,079,550 B2 | 7/2006 | Padovani et al. |
| 7,133,460 B2 | 11/2006 | Bae et al. |
| 7,154,846 B2 | 12/2006 | Chen et al. |
| 7,194,006 B2 | 3/2007 | Wong et al. |
| 7,289,473 B1 | 10/2007 | Padovani et al. |
| 7,349,714 B2 | 3/2008 | Lee et al. |
| 2001/0033558 A1 | 10/2001 | Matsuki et al. |
| 2002/0097697 A1 | 7/2002 | Bae et al. |
| 2002/0160781 A1 | 10/2002 | Bark et al. |
| 2002/0196768 A1 | 12/2002 | Ohgoshi et al. |
| 2003/0002490 A1 | 1/2003 | Wong et al. |
| 2004/0224719 A1* | 11/2004 | Nounin et al. ............. 455/553.1 |
| 2005/0026642 A1 | 2/2005 | Lee et al. |
| 2005/0254464 A1 | 11/2005 | Lundby et al. |
| 2006/0187877 A1 | 8/2006 | Lundby et al. |

FOREIGN PATENT DOCUMENTS

| | | |
|---|---|---|
| CA | 2239524 | 8/2002 |
| CN | 1256817 | 6/2000 |
| DE | 19913086 | 10/2000 |
| EP | 0353759 | 2/1990 |
| EP | 0412583 | 2/1991 |
| EP | 0418865 | 3/1991 |
| EP | 0647147 | 4/1995 |
| EP | 0656716 | 6/1995 |
| EP | 0716520 | 6/1996 |
| EP | 0720407 A2 | 7/1996 |
| EP | 0600713 | 8/1996 |
| EP | 0729240 A2 | 8/1996 |
| EP | 0762703 A1 | 3/1997 |
| EP | 0767548 | 4/1997 |
| EP | 0779755 | 6/1997 |
| EP | 0847147 | 7/1998 |
| EP | 0887947 | 12/1998 |
| EP | 0899906 A2 | 3/1999 |
| EP | 0924878 | 6/1999 |
| EP | 0936753 | 8/1999 |
| EP | 1022862 | 7/2000 |
| GB | 715435 A | 9/1954 |
| GB | 2293947 | 4/1996 |
| GB | 2303769 A | 2/1997 |
| GB | 2311702 | 10/1997 |
| JP | 57-159148 | 10/1982 |
| JP | 59-039150 | 3/1984 |
| JP | 63-184420 | 7/1988 |
| JP | 63-252047 | 10/1988 |
| JP | 01-122242 | 5/1989 |
| JP | 01-170147 | 7/1989 |
| JP | 02-035848 | 2/1990 |
| JP | 03-060251 | 3/1991 |
| JP | 05276132 | 10/1993 |
| JP | 6-318927 | 11/1994 |
| JP | 08-274756 | 10/1996 |
| JP | 8-335899 | 12/1996 |
| JP | 09-008770 | 1/1997 |
| JP | 09-83600 | 3/1997 |
| JP | 9074378 | 3/1997 |
| JP | 09093652 | 4/1997 |
| JP | 9186646 | 7/1997 |
| JP | 9191276 A | 7/1997 |
| JP | 9200825 A | 7/1997 |
| JP | 10-51354 | 2/1998 |
| JP | 10-107769 | 4/1998 |
| JP | 1098763 | 4/1998 |
| JP | 10098763 | 4/1998 |
| JP | 63-141432 | 6/1998 |
| JP | 10155179 A | 6/1998 |
| JP | 10-190625 | 7/1998 |
| JP | 10-285138 | 10/1998 |

| | | |
|---|---|---|
| JP | 11-154904 | 6/1999 |
| JP | 11234202 | 8/1999 |
| JP | 11284570 | 10/1999 |
| JP | 8-125604 | 1/2000 |
| JP | 2000165927 A | 6/2000 |
| JP | 00-224231 | 8/2000 |
| JP | 2002-152849 | 5/2002 |
| KR | 2000-0011799 | 2/2000 |
| RU | 2139636 C1 | 1/1999 |
| RU | 2146850 | 3/2000 |
| SU | 462292 | 2/1975 |
| SU | 1585902 | 11/1988 |
| WO | 9222162 | 12/1992 |
| WO | 9418771 | 8/1994 |
| WO | WO9428643 | 12/1994 |
| WO | 9500821 | 1/1995 |
| WO | WO9503652 A1 | 2/1995 |
| WO | 9507578 | 3/1995 |
| WO | WO9512938 A1 | 5/1995 |
| WO | 9528814 | 10/1995 |
| WO | WO9600466 A1 | 1/1996 |
| WO | WO9608908 | 3/1996 |
| WO | WO9608908 A2 | 3/1996 |
| WO | 9610320 | 4/1996 |
| WO | 9709810 | 3/1997 |
| WO | 9711535 | 3/1997 |
| WO | 9715131 | 4/1997 |
| WO | 9740592 | 10/1997 |
| WO | WO9737443 A1 | 10/1997 |
| WO | WO9819405 | 5/1998 |
| WO | 9835514 | 8/1998 |
| WO | 9852307 | 11/1998 |
| WO | WO9852327 A2 | 11/1998 |
| WO | 9859451 | 12/1998 |
| WO | WO9859443 A1 | 12/1998 |
| WO | 9914975 | 3/1999 |
| WO | 9918684 | 4/1999 |
| WO | WO 9918684 A * | 4/1999 |
| WO | WO9918702 | 4/1999 |
| WO | 9923844 | 5/1999 |
| WO | WO9923844 | 5/1999 |
| WO | 9943101 | 8/1999 |
| WO | WO9949588 | 9/1999 |
| WO | WO9966744 A1 | 12/1999 |
| WO | 0014908 | 1/2000 |
| WO | WO0004728 | 1/2000 |
| WO | 0008706 | 2/2000 |
| WO | WO0014899 | 3/2000 |
| WO | WO0033472 A1 | 6/2000 |
| WO | WO0033480 | 6/2000 |
| WO | 0041542 | 7/2000 |
| WO | 0041543 | 7/2000 |
| WO | WO0042810 | 7/2000 |
| WO | 9903225 | 10/2000 |
| WO | 0105425 | 7/2001 |
| WO | 0152425 | 7/2001 |
| WO | 0180445 | 10/2001 |
| WO | 0235735 | 5/2002 |

OTHER PUBLICATIONS

Eng, et al. "Comparison of Hybrid FDMA/CDMA Systems in Frequency Selective Rayleigh Fading" IEEE J. of Selected Areas of Communications 12(5): 938-951 (1994).
Foerster, et al. "Analysis of Hybrid Coherent FDMA/CDMA Systems in Ricean Multipath Fading" IEEE Transactions on Communications 45(1): 15-18 (1997).
Jalali, et al. "Performance Comparison of Direct Spread and Multicarrier CDMA Systems" IEEE: 2042-2046 (1998).
Kim, et al. "The Performance Improvement of a Multicarrier DS-CDMA System Using Both Tim-Diversity and Frequency Offset" ETRI J. 21(4): 29-40 (1999).
Kondo, et al. "Performance of Multicarrier DS CDMA Systems" IEEE Transactions on Communications 44(2): 238-246 (1996).
Ling, Fuyun "A Matched Filter Bound Analysis of Single- and Multi-Carrier DS CDMA Communications" 1997 Asia Pacific Microwave Conference pp. 161-164.
Lee, et al. "Direct Sequence Spread Spectrum Walsh-QPSK Modulation" IEEE Transactions on Communications 46(9): 1227-1232 (1998).
Lee, et al. "Performance of a Modified Multicarrier Direct Sequence CDMA System" ETRI J. 19(1): 1-11 (1997).
Rowitch, et al. "Coded Multicarrier DS-CDMA in the Presence of Partial Band Interference" IEEE pp. 204-209 (1996).
Xu, et al. "On the Performance of Multicarrier RAKE Systems" IEEE pp. 295-299 (1997).
Xu, et al. "Performance of Multicarrier DS CDMA Systems in the Presence of Correlated Fading" IEEE pp. 2050-2054 (1997).
Ziemer, et al. "Effect of Correlation Between Subcarriers of an MCM/DSSS Communication System" IEEE pp. 146-150 (1996).
D.N. Kinsely, et al. *CDMA 2000: A Third-Generation Radio Transmission Technology*, Bell Labs Technical Journal, Bell Laboratories, US. vol. 3, No. 3, Jul. 1, 1998, pp. 63-78.
International Search Report PCT/US2000/023420, International Search Authority-EPO, Nov. 16, 2000.
International Preliminary Examination Report PCT/US2000/023420, International Search Authority-US, Jan. 30, 2003.
Written Opinion PCT/US2000/023420, International Search Authority US, Sep. 13, 2002.
Adachi, F. et al., "Wideband multi-rate DS-CDMA for next generation mobile communications systems," Wireless Communications Conference, 1997, Proceedings, Aug. 11-13, 1997. pp. 57-62.
Ariyavisitakul, et al.; "Network Synchronization of Radio Networks in Wireless Personal Communications", Electronic Letters 28(25): 2312-2314 (1992).
Goodman, et al.: "Quality of service and bandwith efficiency of cellular mobile radio with variable bit-rate speech transmission", IEEE Trans. On Vehicular Technology, Aug. 1983, vol. VT-32, No. 3, pp. 211-217.
Harper, R.C., "Adaptive Phase and Amplitude Modulation on a Frequency Dispersive Fading Channel", IEEE Transactions on Communications, vol. Com-22, No. 6, Jun. 1974.
Haykin: "An Introduction to Analog and Digital Communications" 1989, John Wiley and Sons, Inc., p. 558.
J. M. Jacobsmeyer, "Adaptive Trellis Coded Modulation for Bandlimited Meteor Burst Channels", 1989 IEEE Military Communications Conference (MILCOM '89), vol. 2, pp. 418-422 (Cat. No. 89CH2681-5).
Jacobsmyer, J.M., "An Adaptive Modulation Scheme for Bandwidth-Limited Meteor-Burst Channels" 21st Century Military Communications—What's Possible?, San Diego, Oct. 23-26, 1988, vol. 3, Oct. 23, 1988, pp. 933-937 IEEE.
Lagarde, P, et al., "The PR4G VHF ECCM System: Extensive Tactical Communications for the Battlefield" Military Communications Conference, 1992. Milcom '92, Conference Record. Communications—Fusing Command, Control and Intelligence., IEEE San Diego, CA.
Massoumi, et al.: "Adaptive Trellis Code Modulation for Mobile Communications", IEEE Pacific Rim Conference on Communications, Computers and Signal Processing, May 9-10, 1991.
Zhang, et al.: "An Integrated Voice/Data System for mobile indoor Radio Networks Using Multiple Transmission Rate", Global Telecommunications Conference. IEEE, Nov. 27-30, 1989, Dallas, TX, vol. 3, pp. 1366-1370.
"CDMA2000 High Rate Packet Data Air Interface Specification," C.S0024 Version 2.0, Published Oct. 27, 2000 by 3rd Generation Partnershp Project 2. Section 8.2.1.3.3.2, 8.2.1.3.3.3, 9.2.1.3.3.2, 9.2.3.3.3.
TIA/EIA/-95-; "Mobile Station-Base Station Compatibility Standard for Dual-Mode Wideband Spread Spectrum Cellular System", Jul. 1993.
3GPP TS 25.202 V6.10.0 Section 9.3 (Dec. 2005).
3GPP TS 25.214 V6.7.1 Section 6.A.2 (Dec. 2005).
International Preliminary Examination Report—PCT/US00/023420, IPEA/US—Jan. 30, 2003.
Written Opinion—PCT/US00/023420—International Search Authority—European Patent Office—Sep. 13, 2002.
"International Search Report PCT/US2000/023420, International Search Authority—European Patent Office, Nov. 16, 2000".

Acampora, "The Use of Resource Sharing, and Coding to increase the Capacity of Digital Satellites," IEEE Journal on Selected Areas in Communications, vol. SAC-1, Jan. 1983.

Acampora, "A Wireless Network for Wide-Band Indoor Communications," IEEE Journal on Selection Areas in Communications, vol. SAC-5, Jun. 1987.

Buchholz et al., "Reai-Time Management of Radio Turnaround in a TDMA/TDD System" MO-LA Technical Developments vol. 22 Jun. 1994.

Falahati, et al., "Implementation of Adaptive 5400 bit/s Modem Frequency Selective HF Radio Links", Electronic Letters: An International Publication, vol. 28, No. 13.

Fifer, et al., "The Low-Cost Packet Radio," Proceedings of the IEEE, vol. 75, No. 1 Jan. 1987.

Filip, et al., "Adaptive Modulation as a Fade Countermeasure. An Olympus Experiment," International Journal of Satellite Communications, vol. 8, 31-41 (1990).

Fischer at al., "Wide-Band Packet Radio for Multipath Environments", IEEE Transactions on Communications, vol. 36, No. 5, pp. 564-576.

Fischer et al., "Wide-Band Packet Radio Technology", IEEE Transactions on Communications, vol. 75, No. 1, Jan. 1987.

Forney, et al., "Efficient Modulation for Band-Limited Channels", IEEE Journal on Selected Areas in Communications, vol. sac-2. No. 5. Sep. 1984.

Goodman. "Embedded DPCM for variable bit rate transmission", IEEE Transactions on Communications, vol, com-28, No. 7: Jul. 1980.

Heegard. at al "A Microprocessor-Based PSK Modem for Packet Transmission Over Satellite Channels", IEEE Transactions on Communications, vol. com-26, No. 5, May 1978.

Henry, et al., "HF Radio Data Communication: CW to Clover", Communications Quarterly, Spring 1992. pp. 11-24.

Hirade at al., "Digital Transmission Technology for Mobile Radio Communication."

Jacobsiveyer, "Adaptive Trellis Coded Modulation for Bandlimiled Meteor Burst Channels", IEEE Journal on Selecte Areas in Communications, vol. 10, No. 3, Apr. 1992.

Jentz, "Method to conserve power in subscribers using C/I+N algorithm", Motorola Technical Developments, vol. 21, Feb. 1994.

Khan, et al., "Adaptive Forward Error Control for Digital Satellite Systems," IEEE Transactions of Aerospace and Electronics Systems, vol. AES-21. No. 4, Jul. 1985.

Knisely et al "CDMA2000: A Third_Generation Radio Transmission Technology", BELL Labs Technical Journal, BELL Laboratories, US, vol. 3, No. 3. Jul. 1, 1988.

Lin, et al., "An Adaptive ARQ Scheme Using Pragmatic TCM", Singapore ICCS 1994 Conference Proceedings, vol. 2, Nov. 14-18, pp. 649-652.

Milstein, et al . "Performace of Meteor-Burst Communication Channels", IEEE Journal on Selected Areas in Communicaions, vol. sac-5, No. 2, Feb. 1987.

Murphy, "Telecommunications Talk," Creative Computing, Jan. 1985, vol. 11. No. 1, pp, 16-22.

Oetting, "An Analysis of Meteor Burst Communications for Military Applications", IEEE Transactions on Communications, vol. com-28, No. 9, Sep. 1980.

Petit, "Clover II: A Technical Overview, AARL Amateur Radio," San Jose, California, Sep. 27-29, 1991.

Petit, "The "Cloverleaf" Performance-Oriented HF Data Communication System," 9th Computer Networking Conference.

Ristenbatt, et al., "Performance Criteria for Spread Spectrum Communications", IEEE Transactions on Communications, vol. com-25, No. 8, pp. 756-783, Aug. 1977.

Rozeostrauch et al., "Control Channel Interference Detection INA TDMA Systems with Frequency Re-Use", Motorola, Inc, Technical Developments, Nov. 1995.

Salz, et al., "An Experimental Digital Multilevel FM Modem", IEEE Transactions on Communications, vol. com-14, No. 3.

Smartmodem 1200B Hardware Reference Manual, Hayes Microcomputer Products, Inc.

Steele, "Deploying Personal Communication Network," Proceedings Wireless 91. The Third National Seminar & Workshop on Wireless Personal Communications, pp. 1-14.

Steele, et al., "Variable Rate QAM for Data Transmission Over Rayleigh Fading Channels," Proceedings Wireless 91, The Third National Senlinat & Workshop on Wireless Personal Communications, pp. 1-14.

Thomas, et al , "A New Generation of Digital Microwave Radios for U.S. Military Telephone Networks," IEEE Transactions on Communications, vol. COM-27, No. 12, Dec. 1979.

Thomspon et al , "Analysis of diversity reception improvements in spread spectrum receivers", Proceedings of the IEEE 3rd International Symposium on Spread Spectrum Techniuues and Applications, vol. 2, pp. 455-459, Jul. 4-6, 1994, Oulu, Finalnd.

Tyson, Tom; "A Method for improved Site Selection in a Cell-Eased TDMA Fail-Soft System" MOTOROLA Technical Developments; Dec. 1. 1997, pp. 194-195.

Vos, "Minimum Distance Channel Quality Metric", Motorola, Inc., Technical Developments, vol. 20, Oct. 1993, pp. 8-9.

Webb, "QAM:The Modulation Scheme for Future Mobile Radio Communications," Electronics & Communication Engineering Journal, Aug. 1992, pp. 167-176.

Weitzen, et al , "A High Speed Digital Modem for the Meteor Channel", Proceedings of the Seventeenth Annual Conference on Information Science and Systems, Mar. 23-25, 1983.

Weitzen, "Feasibility of high speed digital communications on the meteor scatter channel", University of Wisconsin, 1983.

West, "Data oncentration Method", IBM Technical Disclosure Bulletin, pp. 487-489.

Zhang, et al.; "An Integrated Voice/Data System for mobile indoor Radio Networks Using Multiple Transmission Rate", Global Telecommunications Conference. IEEE, Nov. 27-30, 1989, Dallas, TX, vol. 3, pp. 1388-1370.

ITU-T V.22 bis, 'Data Communication Over the Telephone Network: 2400 Bits Per Second Duplex Modem Using the Frequency Divisiontechnique Standardized for Use on the General Switched Telephone Network and on Point-To-Point 2-Wire Leased Telephone-Type Circu.

ITU-T V, 32, "Data communication over the telephone network: A family of 2-wire, duplex moderns operating at data signalling rates of up to 9600 bit/s for us eon the general switched telephone network and on leased telephone type circuits", V. 32Mar. 1993.

Partial Eurpocean Search Report—EP09158507, Search Authority—Mucnih Patent Office—May 29, 2009.

3rd Generation Partnership project, Technical specification group radio access network 25.101 section 9.3, User equipment (UE) Radio Transmission and Reception (FDD, Release Jun. 12, 2005.

3rd Generation Partnership project, Technical specification group radio access network 25.214 section 6A.2 Physical layer procedures (FDD, Release Jun. 12, 2005).

Bi Q et al.: "The performance of DS-CDMA for wireless local loop" Spread Spectrum Techniques And Applications Proceedings, 1996., IEEE 4th International Symposium On Mainz, Germany Sep. 22-25, 1996, New York, NY, USA,IEEE, US, vol. 3, Sep. 22, 1996, pp. 1330-1333.

Chuang J C-I et al.: "Uplink power control for TDMA portable radio channels" Proceedings Of The International Conference On Communications (ICC). Geneva, May 23-16, 1993, NewYork, IEEE, US, vol. 3, May 23, 1993, pp. 584-588.

European Search Report—EP10011384, Search Authority—Munich Patent Office, Dec. 6, 2010.

European Search Report—EP10011386, Search Authority—Munich Patent Office, Dec. 6, 2010.

European Search Report—EP10011387, Search Authority—Munich Patent Office, Dec. 6, 2010.

European Search Report—EP10179607, Search Authority—Munich Patent Office, Nov. 4, 2010.

Huang, Chenhong. "An Analysis of CDMA 3G Wireless Communications Standards," 1999 IEEE 49th Vehicular Technology Conference, United States of America, IEEE, Jul. 1999, vol. 1, pp. 342-345.

Prasad, R. et al., "An Overview of CDMA Evolution Toward Wideband CDMA", IEEE Communications Survey, 1998. pp. 2-29, vol. 1. No. 1.

Tiedemann, Ed. "Using a 1X Reverse Link with a 3X Forward Link," 3GPP2 TSG-C Contribution, Aug. 19, 1999, 3GPP2-C30-19990817-038, URL: ftp://ftp.3gpp2.org/TSGC/Working/1999/TSG-C_9908/TSG-C.3/C30-19990817-038%20QCOM%201X_RL.doc.

Bruhn, S. et al., "Concepts and Solutions for Link Adaption and Inband Signaling for the GSM AMR Speech Coding Standard," IEEE 49th Vehicular Technology Conference, vol. 3, XP002901443, May 16, 1999, pp. 2451-2455, doi: 10.1109/VETEC.1999.778517.

ETSI EN 301 709, V.7.0.2: "Digital cellular telecommunications system (Phase 2+); Link Adaptation (GSM 05.09 version 7.0.2 Release 1998)," (Dec. 1, 1999), pp. 1-13, XP002177164.

European Search Report—EP10179610, Search Authority—Munich Patent Office, Jan. 12, 2011.

European Search Report—EP10179620—Search Authority—Munich—Feb. 17, 2011.

Translation of Office Action in Chinese application 01821314.6 corresponding to U.S. Appl. No. 11/165,882, citing CN1256817 dated Apr. 1, 2011.

Translation of Office Action in Japan application 2002-543799 corresponding to U.S. Appl. No. 11/404,414, citing JP10107769, JP2000224231 and W09428643 dated Dec. 21, 2010.

Translation of Office Action in Japan application 2010-036136 corresponding to U.S. Appl. No. 11/499,203, citing JP8-274756, JP9-83600, JP9-74378 and JP9-186646 dated Nov. 9, 2010.

* cited by examiner

METHOD AND APPARATUS USING A MULTI-CARRIER FORWARD LINK IN A WIRELESS COMMUNICATION SYSTEM

BACKGROUND OF THE INVENTION

1. Field of the Invention

The present invention relates to communications. More particularly, the invention concerns a method and apparatus for transmitting information in a wireless communication system.

2. Description of the Related Art

FIG. 1 illustrates a portion of the radio frequency spectrum used in a common telecommunications system. Frequency range 100 centered around 800 MHz has historically been known as the cellular frequency range and frequency range 102 centered about 1900 MHz is a newer defined frequency range associated with personal communication services (PCS). Each range of frequencies, i.e., the cellular and PCS, are broken into two portions. In the cellular frequency range 100, there is a reverse link portion 104 that is used for communications from a mobile communication device to a base station such as a cellular base station. Portion 106 of cellular frequency range 100 is used for forward link communications, that is, communications from a cellular base station to a mobile communication device. In a similar fashion, portion 108 of PCS frequency range 102 is used for reverse link communications, that is, communications from a mobile communication device to a base station. Portion 110 of PCS frequency range 102 is used for reverse link communications, i.e., communications from a base station to a mobile communication device.

Each of the frequency ranges is broken into bands that are typically associated with different service providers. In the case of cellular frequency range 100, frequency bands 112 and 114 are designated band "A" for reverse link and forward link communications, respectively. A reverse link is the band connecting a mobile station to a base station, and a forward link is the band connecting a base station with a mobile station. In a particular geographic area, a cellular service provider is assigned frequency band "A" in order to carry out mobile communications. Likewise, in the same geographic area another cellular service provider is assigned frequency bands 116 (for forward link communications) and 118 (for reverse link communications) which are designated band "B". The transmit and receive frequencies are separated by 45 MHz and with the minimum separation between transmit and receive bands is 20 MHz. This minimum separation is to avoid interference between the forward and reverse links and to permit diplexers, which separate the forward and reverse link signals in a mobile station to be used.

A few years ago, the US Government auctioned the PCS frequency spectrum to service providers. As with the cellular frequency range, the PCS frequency range is broken into several bands where a different service provider may use a particular frequency band for which it is licensed within a particular geographical area. The PCS bands are referred to as A, B, C, D, E and F. The A band includes reverse link band 120 and forward link band 122. The B band includes reverse link band 124 and forward link band 126. Band C includes reverse link band 128 and forward link band 130. The reverse link and the forward link band of A, B and C bands are each 15 MHz wide. The D band includes reverse link band 132 and forward link band 134. The E band includes reverse link band 136 and forward link band 138. Likewise, band F includes reverse link band 140 and forward link band 142. The reverse link and forward link bands of D, E and F are each 5 MHz wide. Each of the different cellular and PCS bands can support a number of communications carriers in both the reverse link and forward link direction.

As shown in FIG. 1, it is possible to have as many as eight different wireless communication service providers in a particular area—two cellular service providers, each having a total allocated bandwidth of 25 MHz (forward and reverse links), and six PCS service providers, each having a total allotted bandwidth of 30 MHz for the A, B, and C blocks or 10 MHz for the D, E, and F blocks. These providers may employ different technologies for transmitting and receiving telephone calls, data, control commands, or other types of information, singularly and collectively referred to in this application as information signals. For example, a time-division-duplexing technique, a frequency-division-duplexing technique, or a code-division-multiple-access (CDMA) technique might be employed by a provider as described below. Further, if the carrier is using CDMA, then various CDMA releases are available such as IS-95-A and IS-95-B.

Recently, in response to consumers demand for greater service options, the International Telecommunications Union (ITU) solicited proposals for Third Generation wireless communications. The Third Generation Proposals strive to expand the capabilities of the preceding technologies to include wireless e-mail, Web browsing, and corporate and local network access, as well as videoconferencing, e-commerce and multimedia. One of the candidate submissions to the ITU was proposed by subcommittee TR45.5 of the Telecommunications Industry Association (TIA) and was called cdma2000, which has since been developed and continues to be developed under the name of IS-2000. The proposed cdma2000 system includes three modes of operation: 1×, 3× direct spread (DS) and 3× multi-carrier (MC). Each of these modes can be operated in frequency division duplex (FDD) or time-division duplex (TDD) manner.

The 1×FDDmode operates within a 1.25 MHz bandwidth on both the forward and reverse links, thereby providing for higher capacity in the 1.25 MHz bandwidth and supporting high-speed data transmissions. The spreading rate is 1.2288 Mcps on both the forward and reverse links of 1× systems. The 3×FDDmode operates within a 3.75 MHZ band on both forward and reverse links. The 3× mode forward link employs either a direct spread or a multi-carrier transmission format. In the 3× direct spread mode, a single forward link carrier with a chip rate of 3.6864 Mcps is used; in the 3× multi-carrier mode, the forward link consists of three carriers that are each spread at a spreading rate of 1.2288 Mcps. The 1×TDD mode operates within a single 1.25 MHz bandwidth for both the forward and reverse links. The 3× direct spread and multi-carrier TDD modes operates within a single 3.75 MHz for both the forward and reverse links.

By using the 3×FDD mode and providing a forward link using the multi-carrier format, a communications system is fully compatible with existing IS-95 system. That is, the cdma2000 forward link structure may be "over-laid" on existing PCS systems. One attribute that makes the forward link multi-carrier system compatible with existing systems is that it preserves orthogonality of signals transmitted in the forward link. The reverse link is not orthogonal, so cdma2000 systems use a direct spreading to 3.6864 Mcps. When used, the time-division-duplex (TDD) mode of operation allows both the forward link and reverse link to be transmitted in a single 1.25 MHz band. The TDD forward link is transmitted in a first time interval and the TDD reverse link is transmitted in a non-overlapping second time interval. The transmissions in both time intervals are direct spread at a 1.2288 Mcps spreading rate.

As mentioned above, Third Generation Systems such as cdma2000 3× are designed for transmitting information that may have very high data transfer requirements, such as email downloading and web browsing. For example, a mobile station user may send a simple message requesting that a page from web site be downloaded to his mobile phone. This simple request requires very little bandwidth when transmitted on the reverse link to the base station, but timely downloading of the web site on the forward link from the base station to the mobile station will require substantial bandwidth. A request for a page may be in the order of a few hundred bytes, but the response from the web server can be several tens of thousands of bytes, particularly if it includes graphics or pictures. However, in the currently proposed Third Generation Systems, the bandwidth allocated to reverse link transmissions is the same as the bandwidth allocated for forward link transmissions.

What is needed is a method and apparatus that will allow for the bandwidth allocated to the forward link to be different than the bandwidth allocated for the reverse link. One version of the method and apparatus should provide for better spectrum management. Further, the method and apparatus should allow the user of a technology such as cdma2000 1× to easily transition to a newer version of the technology, such as cdma2000 3×.

SUMMARY OF THE INVENTION

Broadly, the present invention relates to wireless communications. More particularly, the invention concerns forward link and reverse link designs utilized in a wireless telecommunications system. In various embodiments, the invention allows a system using the 1× mode of cdma2000 to easily migrate to using a 3× mode of cdma2000. In other embodiments, the invention provides for better spectrum management, and allows the bandwidth used in the forward link to vary from the bandwidth in the reverse link. The invention also provides for less unwanted emissions, thus permitting more effective utilization of the bandwidth.

In one embodiment, the present invention provides a method that improves spectrum use. With the method, a single cdma2000 1× reverse link (1×RL) is used in conjunction with a cdma2000 3× forward link (3×FL). The 3×FL has three 1.2288 Mcps carriers and the 1×RL uses one 1.2288 Mcps carrier. The 3×FL carriers may occupy adjacent "frequency bins" as described below, or the bins might not be adjacent. In an exemplary embodiment where the 3× carrier bins are adjacent, the 1× carrier bin may be located in the center frequency bin range. In other embodiments, it may be located at anyone of the three frequencies. In general, it can be located anywhere within a providers allotted frequency band, or where allowed by multiple providers, anywhere within the frequency spectrum for the cellular or PCS spectrum. In another embodiment, the 3×FL carrier uses one or more carriers with a chip rate that is greater than the chip rate used on the 1×RL carrier.

In another embodiment, the invention provides an article of manufacture containing digital information executable by a digital signal-processing device. In another embodiment, the invention yields an apparatus used to practice the methods of the invention. The apparatus may comprise a remote station and at least one base station that has, amongst other things, a transceiver used to communicate information signals to the remote station. Obviously, to receive signals, the remote station also includes a transceiver which transmits and receives from the base station, and possibly satellites where applicable. The apparatus will also include at least one digital processing apparatus, such as a microprocessor, that is communicatively coupled to the network or one of its component parts.

The invention provides its users with numerous advantages. One advantage is that it provides better spectrum management to a service provider. Another advantage is that a cdma2000 1× system can be upgraded to cdma2000 3× system services on an incremental basis if desired without having to entirely replace existing hardware at once. As explained below, additional hardware can be added to provide particular types of service as demand for those service types increase. This allows a provider to economically supply only those services that its users demand. The invention also provides a number of other advantages and benefits that should become even more apparent after reviewing the following detailed descriptions of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, and wherein.

DETAILED DESCRIPTION OF EXEMPLARY EMBODIMENTS OPERATION

FIGS. 2-6b illustrate examples of various method and apparatus aspects of the present invention. For ease of explanation, but without any limitation intended, these examples are described in the context of a digital signal processing apparatus, one example of which is described following the discussion of the various method embodiments below.

An exemplary embodiment of the present invention is based upon a CDMA system. CDMA systems are disclosed in TIA/EIA/IS-2000, prepared by the Telecommunications Industry Association, entitled "SPREAD SPECTRUM DIGITAL TECHNOLOGY—MOBILE AND PERSONAL COMMUNICATIONS STANDARDS," and TIA/EIA/IS-95-x entitled "MOBILE STATION-BASE STATION COMPATIBILITY STANDARD FOR DUAL-MODE WIDEBAND SPREAD SPECTRUM CELLULAR SYSTEM", all of which are incorporated by reference herein. As disclosed in IS-2000, a standard cdma2000 3× multi-carrier (MC) forward link (FL) system uses three 1.2288 Mcps carriers paired with a reverse link (RL) that uses a single 3× carrier. This single carrier provides a direct spread chip rate of 3.6864 Mcps. The present invention improves upon this normal configuration.

It should be understood that the methods of the present invention as disclosed below apply to a broad range of services. These services include voice and data services, but the invention is particularly suitable for data services, such as email and Web browsing, which typically have a significantly greater FL load requirement than RL load requirement.

Spectrum Management

Figure 1:
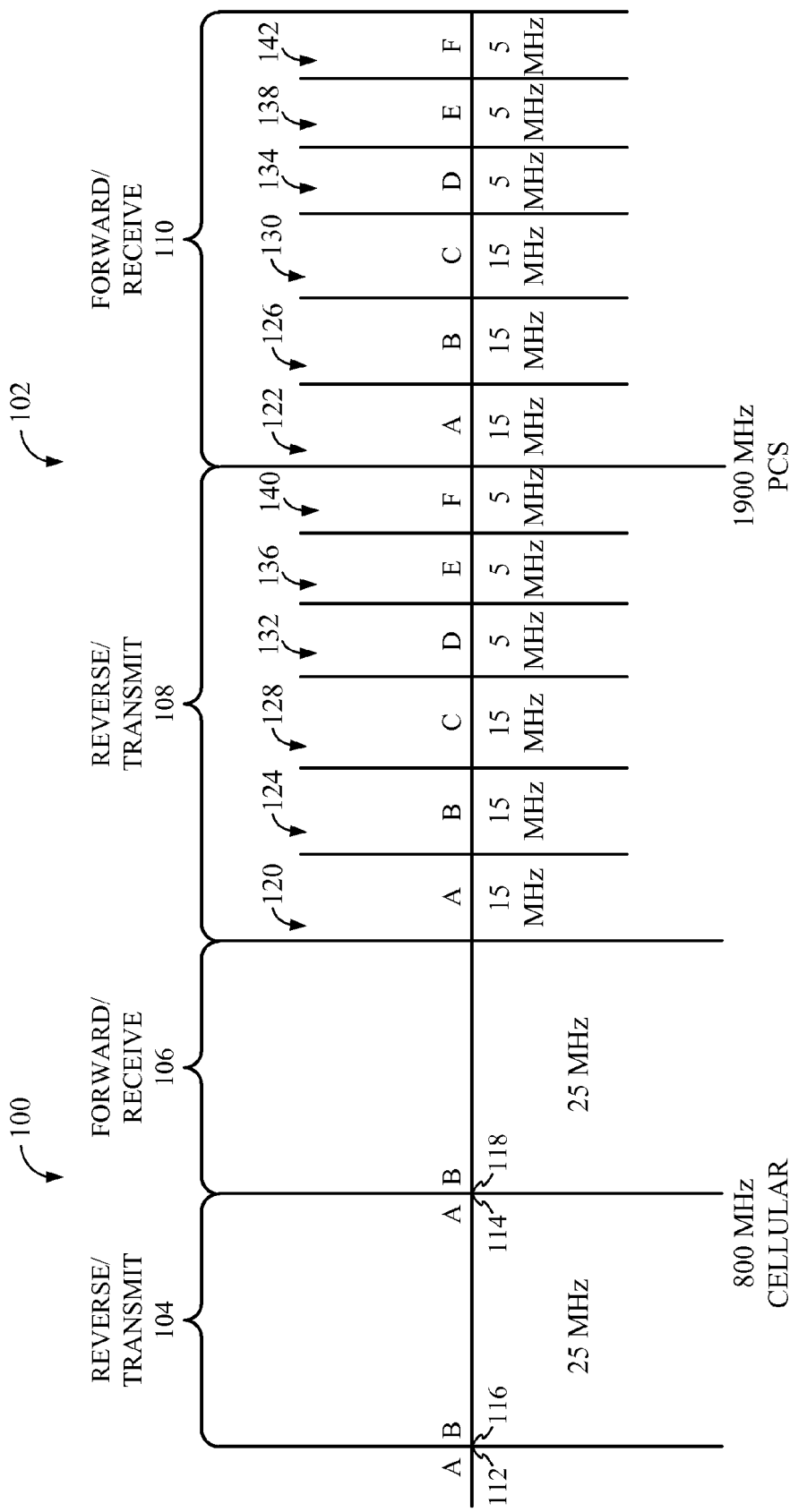
FIG. 1 illustrates the frequency spectrum used for wireless communications.
Figure 2:
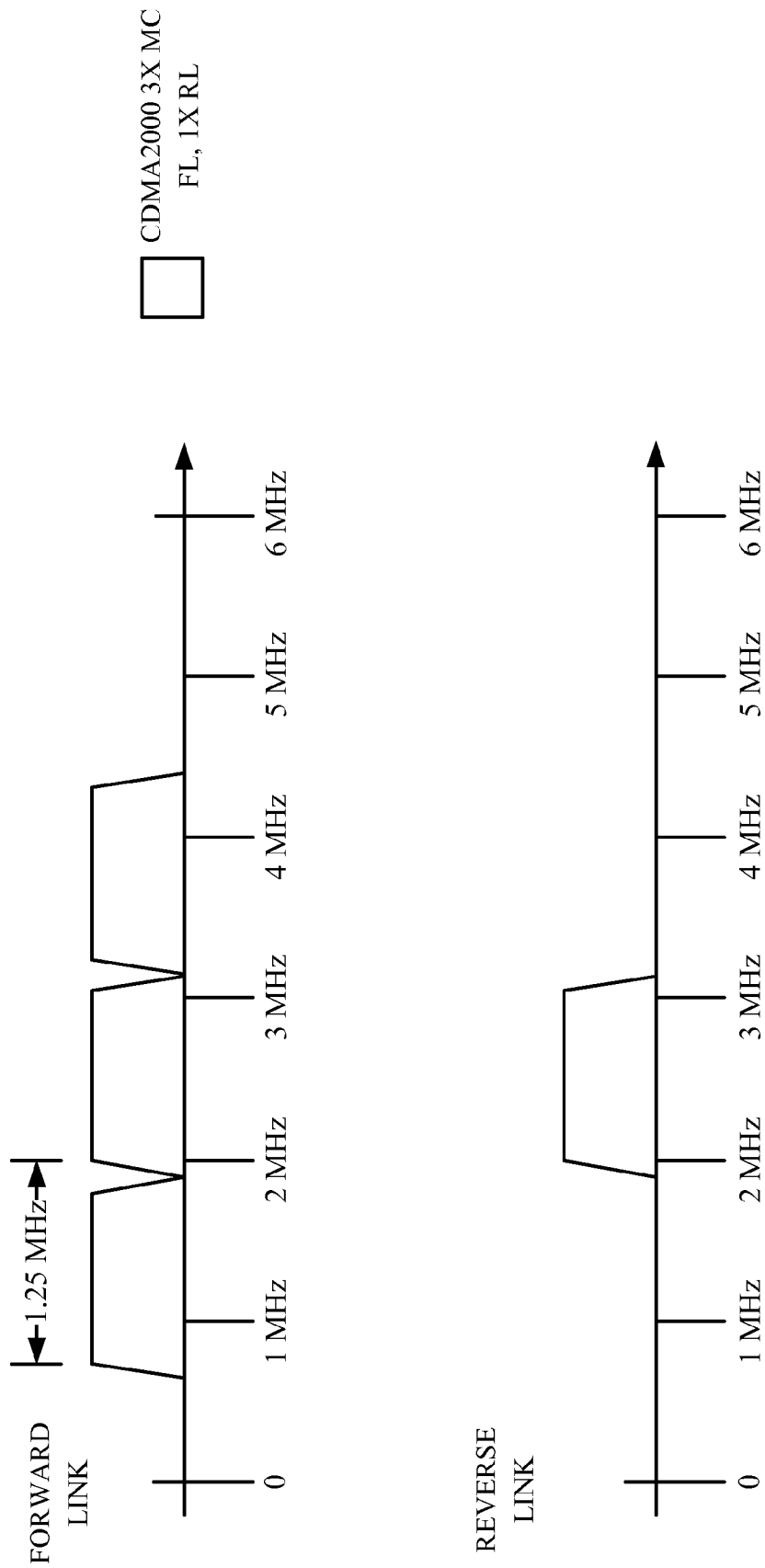
FIG. 2 shows a cdma2000 3× multi-carrier forward link and a single cdma2000 1× reverse link used in accordance with the invention.

In one embodiment, the invention uses a cdma2000 MC FL and a single cdma2000 1× reverse link as illustrated in FIG. 2. For a cdma2000 PCS configuration, each MC FL carrier is separated by 1.25 MHz. In the figure, the 1×RL carrier is shown in a center "frequency bin," wherein the term frequency bin describes a 1.25 MHz band within a band class. However, in other embodiments, the 1×RL carrier could be located in any one of the three possible frequency bins corresponding to each of the three MC FL frequencies. In the example of FIG. 2, the three possible bins have center frequencies for each carrier of 1.25 MHz, 2.5 MHz, and 3.75 MHz respectively. The 3×MC FL is centered at 2.5 MHz. In other embodiments, the 1×RL carrier may be in any frequency bin allocated to a provider.

As is known in the art and discussed below, a mobile station can transmit the 1×RL on any frequency within a provider's band. There are a number of well-known ways that can be used to generate the different RL frequencies. The small geometries being used for digital signal processing devices, such as semiconductors, permit the use of high clock rates with relatively low power consumption. Thus, it is quite practical to generate an RL waveform that can be varied over the bandwidth allocated to a provider. In particular, it is quite simple to generate the three bins described above. One benefit of this invention is that there really isn't any change in the physical layer structure of the cdma2000 1× technique to implement the invention, wherein physical layer refers to the communication protocol between a mobile station and a base station that is responsible for the transmission and reception of data. For example, a power control signal for RL power control can be sent on the three FL multi-carriers and the power control stream for FL power control can be sent on a single RL carrier.

Figure 3:
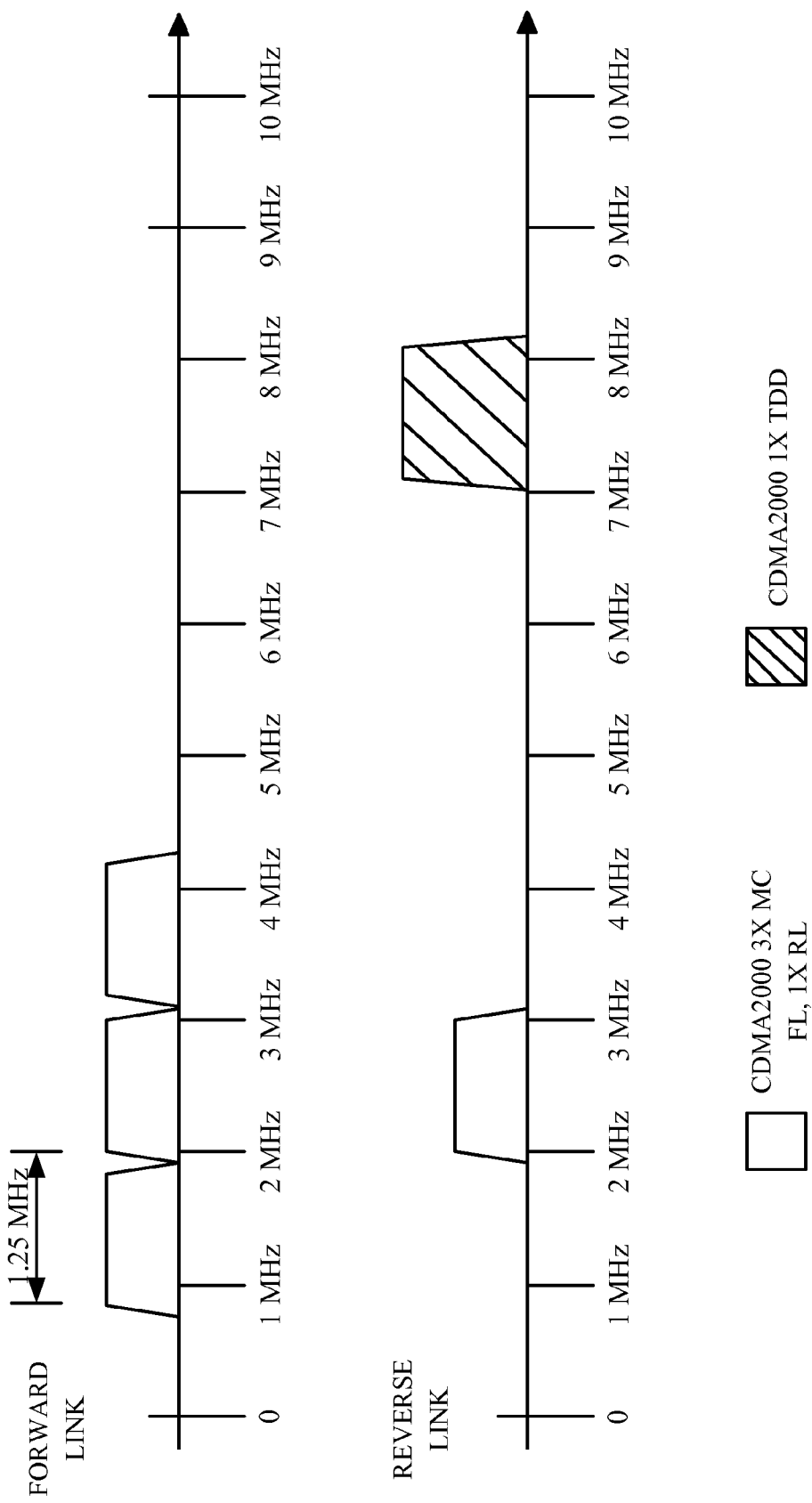
FIG. 3 shows a grouping in a band of CDMA reverse links that allows room in the band for TDD channels used in accordance with the invention.
Figure 7:
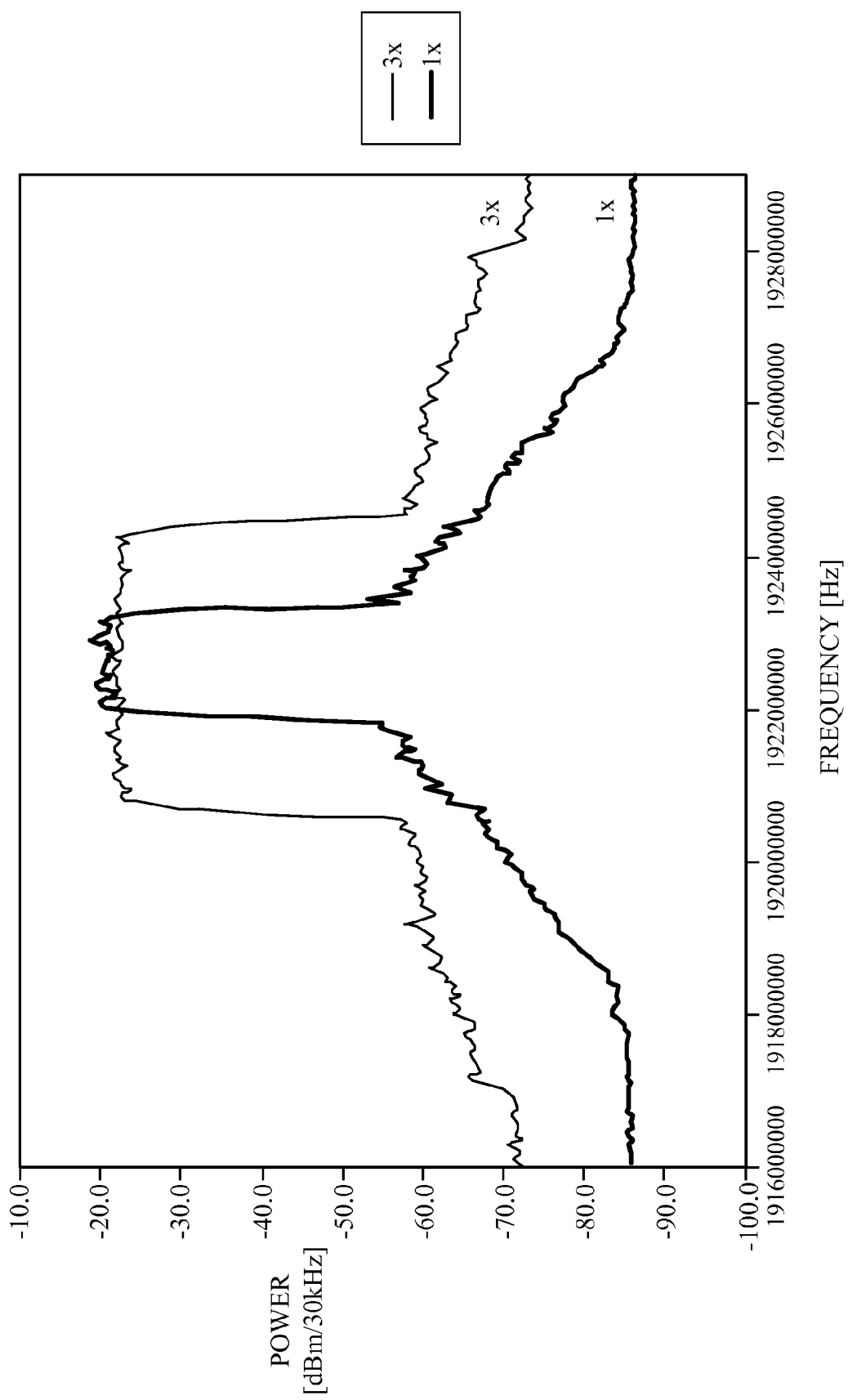
FIG. 7 is a diagram showing the spectrum of a 1× and a 3× reverse link spectrums.

By moving the cdma2000 1×RL over a wide frequency range, and the asymmetric structure that results, the RLs can be grouped in one part of the frequency band and the FLs in another part of the frequency band. This allows for novel and previously undiscovered opportunities in spectrum management. One such arrangement is shown in FIG. 3. Here, the RLs are grouped together, leaving room in the provider's band to use 1× and 3×FDD channels and 1× time-division-duplexed (TDD) channels. It should be noticed that the TDD usage is on the RL where interference issues will be less problematic than the other way around, particularly if FDD service is considered the more important service. The separation of frequency bands between the FDD and the TDD service is sufficient to provide little interference between the FDD and TDD services. Accordingly, the TDD mobile station transmitter may be using the same frequency band as the FDD base station transmitter if there is sufficient frequency separation between the mobile station and the base station. FIG. 7 shows the emissions for both 1× and 3× reverse links from a mobile station. Ideally, the transmitted spectrums would be exactly the bandwidth of 1.2288 MHz for 1× or 3.6864 MHz for 3×. However, intermodulation distortion in the transmitter causes unwanted emissions. As can be seen in FIG. 7, the pedestal due to intermodulation distortion in the transmitter is significantly broader in bandwidth with a 3× reverse link than a 1× reverse link. The close in pedestal is due to $3^{rd}$ order intermodulation products; the farther out pedestal is due to $7^{th}$ order intermodulation products. The bandwidth of each pedestal is approximately equal to the chip rate. Thus, the bandwidth of the 3× reverse link including the $3^{rd}$ order pedestal is approximately three times the chip rate, or 11.0592 MHz. In contrast, the bandwidth of the 1× reverse link including the $3^{rd}$ order pedestal is approximately three times the chip rate, or 3.6864 MHz. The intermodulation distortion can be reduced (and thus the unwanted emissions can be reduced) by having a more linear power amplifier. However, a more linear power amplifier in the mobile station requires more battery power for the same power output. Since a design goal of a mobile station is to have a long battery life, there is a tradeoff between unwanted emissions and battery life. As is easily understood from the discussion, the 3× waveform has much broader emissions in terms of bandwidth which results in a greater guardband to TDD and other systems. While emissions from the base station are also a concern, base stations usually don't use batteries as their main power source. Thus, having a more linear power amplifier is significantly less difficult than in a mobile station.

Forward Link Distribution by Data Type

In one embodiment of the proposed invention using a cdma2000 MC FL transmission system, each of the channels of information is evenly distributed across each of the three carriers of the forward link. For example, when transmitting a data signal on the forward link, the symbols for that data signal are evenly distributed with a third of the symbols transmitted on each of the carriers. The benefit of this method is that is provides maximum frequency diversity and increases the reliability of the transmission of the signal. This method minimizes problems caused by frequency dependent propagation characteristics, such as fading.

However, using this even-distribution embodiment reduces the flexibility that a multi-carrier forward link can provide. Therefore, in another embodiment of the present invention, different types of information are transmitted using different carriers. For example, fundamental channel data such as speech data may be transmitted on a first carrier while supplemental channel data such as high-speed digital data is transmitted on a second carrier. This allows the system to be adapted to the needs of the area that it is serving and permits a service provider to incrementally increase the services provided to its customers.

For example, when a provider has a three-carrier FL system, he may elect initially to provide speech services on a 1× band. Later, in response to the needs of his customers, a second band can be deployed to carry additional speech services, or the band may be allocated to the purpose of carrying high-speed digital data. Thus, in this embodiment of the present invention, the bands are allocated to carrying different types of data.

In yet another embodiment, three cdma2000 1×FLs are provided on adjacent frequencies with a single cdma2000 1×RL. Unlike techniques used for multi-code transmissions, multiple FL code channels are assigned to a mobile station on different frequencies. Any combination of code channels can be used on the three frequencies. For example, a 307.2 kbps FL code channel can be supplied on each of the FL carriers, providing a total data rate of 921.6 kbps. In another embodiment, the spectrum management methods discussed in the previous section can be used with this method. In another arrangement, one of the forward link channels coveys power control information for the RL and a fundamental channel. A fundamental channel is generally a channel that carries voice, low speed rate, such as acknowledgements, and control information. Other frequencies can be used for supplemental channels that operate in conjunction with the fundamental channel, and/or possibly other channels, to provide higher data rate services.

These embodiments have the advantage that existing base station (BS) hardware may be used and, when necessary, supplemented with additional hardware to increase the forward link transmission rates. Supplementing existing hardware, as opposed to replacing an entire base station, is less expensive. Further, the methods of the present invention allow a provider to easily transition from a cdma2000 1× system to a cdma2000 3× system. However, in order to reuse existing BS hardware, some simplifications may be needed in various implementations. One such simplification is that fast (800 Hz) forward link power control used for controlling the transmission power on one frequency probably cannot be used to control the transmit power on other frequencies. This situation arises if a particular BS design uses separate hardware cards for each frequency. Separate hardware cards would not permit the transfer of fast power control streams between frequencies in common configurations.

Further, for high-speed data channels, particularly channels with long interleavers, fast forward link power control is not always the best technique for controlling power if the goal is to maximize system capacity. Thus, in this embodiment, a slower form of power control, such as one widely known in the art, should be used. For example, one way of performing FL power control for these additional frequencies is to control the transmitted power from a selector, as is currently done with many IS-95 systems. There, algorithms in a selector determine when the power transmitted to a mobile station needs to be changed and sends the gain to the BS every frame. A more detailed description of the technique may be found in TIA/EIA/IS-634, entitled "MCS-BS INTERFACE (A-INTERFACE) FOR PUBLIC 800 MHZ," published by the Telecommunications Industry Association, and incorporated by reference herein.

As a result, fast forward power control can be used on one FL frequency which contains the fundamental, control channels, and perhaps some supplemental channels. Slow power control can be used on other FL frequencies which contain additional supplemental channels.

HARDWARE COMPONENTS AND INTERCONNECTIONS

A digital data processing apparatus used to execute a sequence of machine-readable instructions as mentioned above may be embodied by various hardware components and interconnections as described in FIGS. 4a-6b.

Figure 4B:
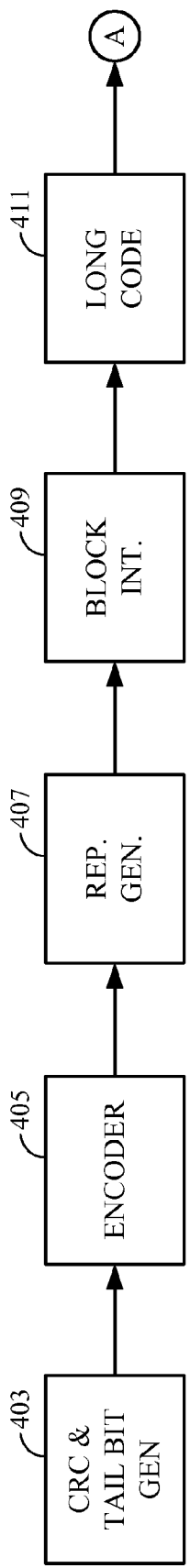
FIG. 4b is a block diagram of a general channel structure used in accordance with the invention.
Figure 4A:
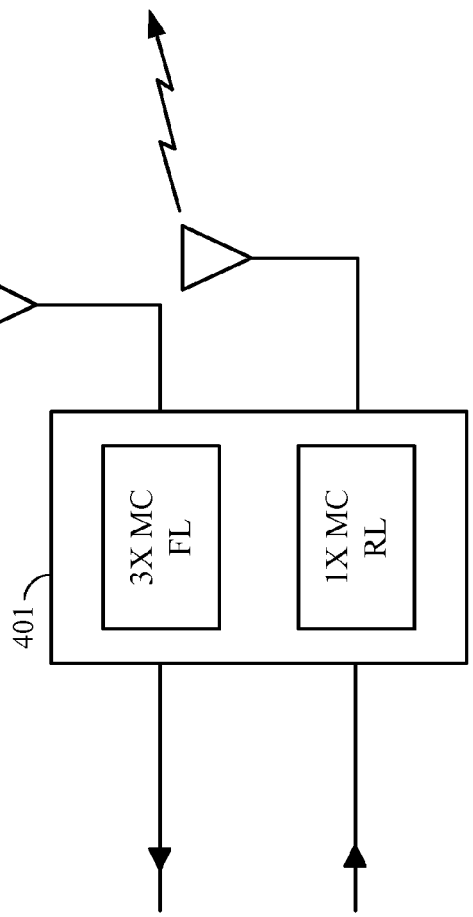
FIG. 4a is a block diagram of a general configuration for a mobile station used in accordance with the invention.

FIG. 4a shows a simple block representation of a mobile station (MS) 401 configured for use in accordance with the present invention. MS 401 receives a signal from a base station (not shown) using a cdma2000 3×MC forward link. The signal is processed as described below. MS 401 uses a cdma2000 1×RL to transmit information to the base station.

FIG. 4b shows a more detailed block representation of a channel structure used to prepare information for transmission by MS 401 in accordance with the present invention. In the figure, information to be transmitted, hereafter referred to as a signal, is transmitted in bits organized into blocks of bits. A CRC and tail bit generator (generator) 403 receives the signal. The generator 403 uses a cyclic redundancy code to generate parity check bits to assist in determining the quality of the signal when received by a receiver. These bits are included in the signal. A tail bit—a fixed sequence of bits—may also be added to the end of a block of data to reset an encoder 405 to a known state.

The encoder 405 receives the signal and builds a redundancy into the signal for error-correcting purposes. Different "codes" may be used to determine how the redundancy will be built into the signal. These encoded bits are called symbols. The repetition generator 407 repeats the symbols it receives a predetermined number of times, thus allowing part of the symbols to be lost due to a transmission error without affecting the overall quality of the information being sent. Block interleaver 409 takes the symbols and jumbles them. The long code generator 411 receives the jumbled symbols and scrambles them using a pseudorandom noise sequence generated at a predetermined chip rate. Each symbol is XORed with one of the pseudorandom chips of the scrambling sequence.

Figure 5B:
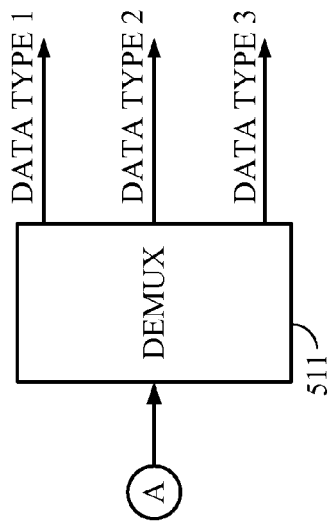
FIG. 5b shows an exemplary arrangement for a demultiplexer 511 shown in FIG. 5a and used in accordance with the invention.
Figure 5C:
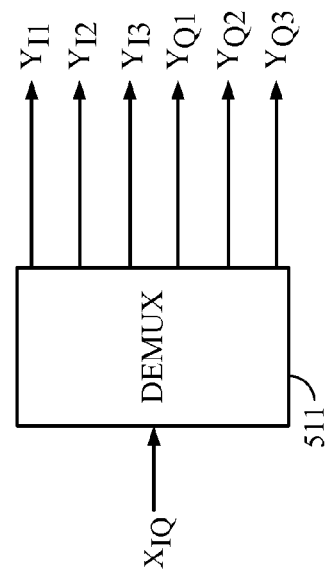
FIG. 5c shows another arrangement for a demultiplexer 511 shown in FIG. 5a and used in accordance with the invention.
Figure 5A:
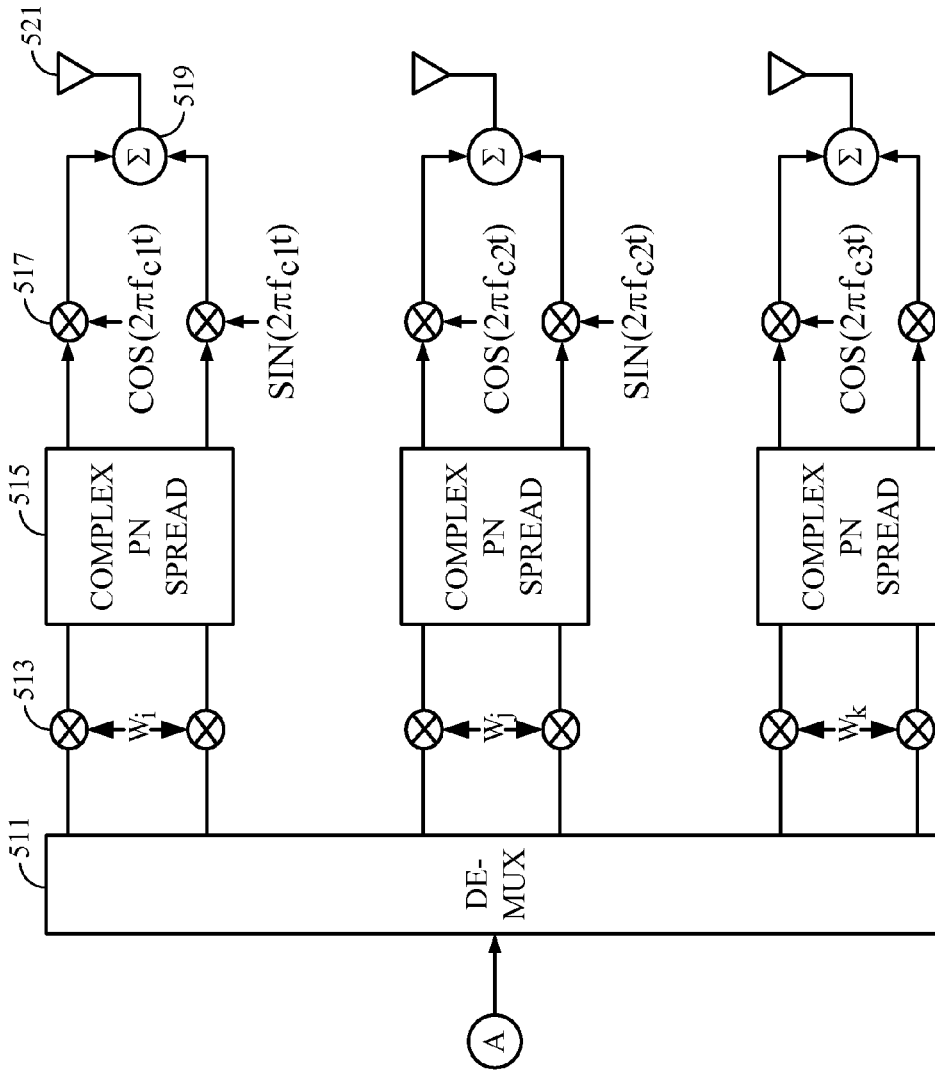
FIG. 5a is a block diagram of a portion of the hardware components and interconnections of a digital signal processing apparatus used in accordance with the invention.

The information may be transmitted using more than one carrier (channel) as explained with regards to the method, above. Accordingly, demultiplexer (DEMUX) 511, shown in FIG. 5a, takes the input signal "a" and splits it into multiple output signals in such a way that the input signal may be recovered. As shown in FIG. 5b, in one embodiment the signal "a" is split into three separate signals, each signal representing a selected data-type, and is transmitted using one FL channel per data-type signal. In another embodiment, DEMUX 511 as shown in FIG. 5c splits signal "a" into two components per data-type. Regardless of the arrangement, the present invention contemplates that distinct signals generated from a parent signal can be transmitted using one or more channels.

Further, this technique can be applied to multiple users whose signals are transmitted using completely or partially the same FL channels. For example, if the signals from four different users are going to be sent using the same three FL channels, then each of these signals is "channelized" by demultiplexing each signal into three components, where each component will be sent using a different FL channel. For each channel, the respective signals are multiplexed together to form one signal per FL channel. Then, using the technique described herein, the signals are transmitted. Returning to FIG. 5a, the demultiplexed signal is then encoded by Walsh encoder 513 and spread into two components, components I and Q, by complex PN spread 515 and multiplier 517. These components are summed by summer 519 and communicated to a mobile station (not shown) by transmitter 521.

Figure 5D:
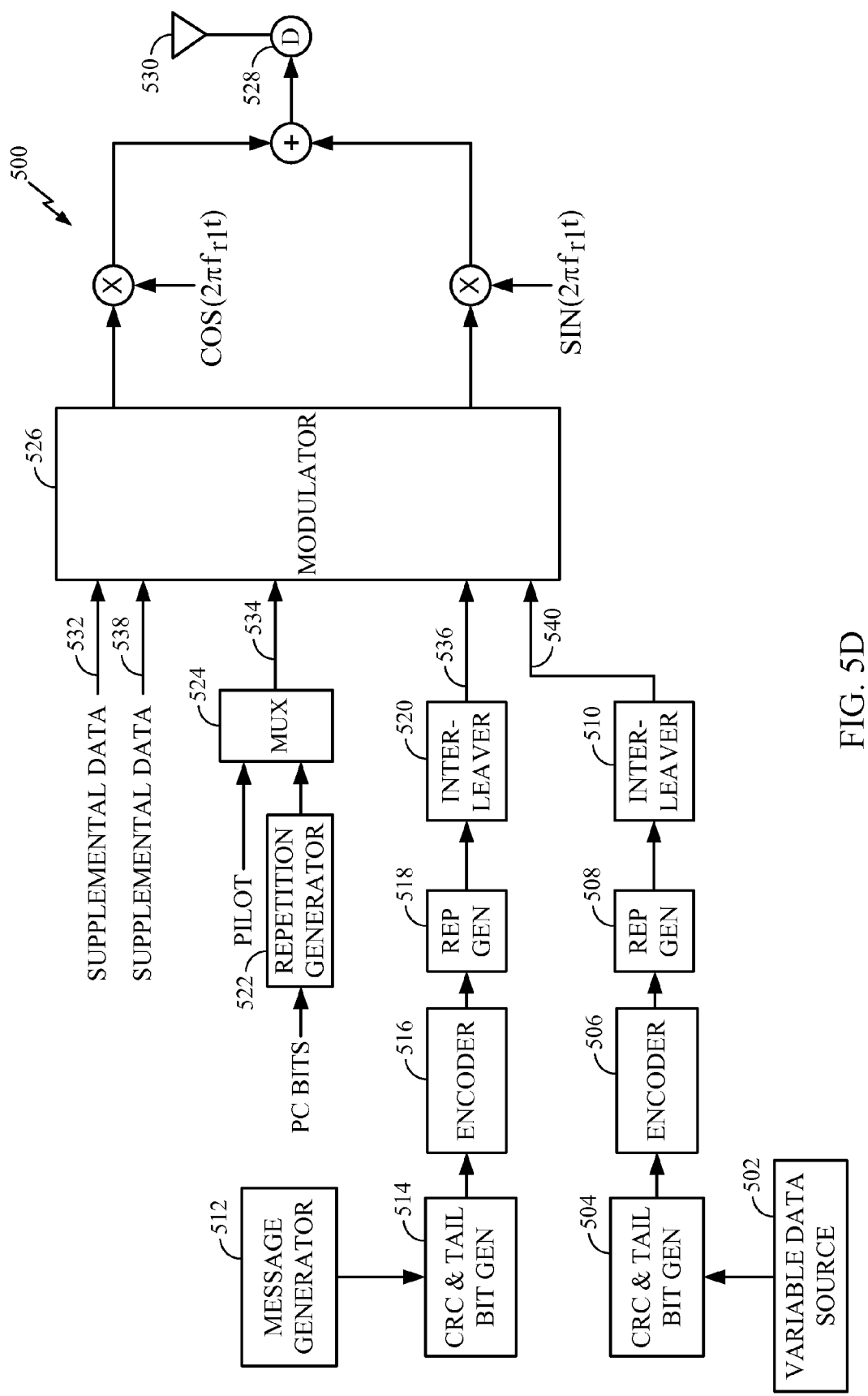
FIG. 5d is a block diagram of the hardware components and interconnections of a digital signal processing apparatus used in accordance with the invention.

FIG. 5d illustrates a functional block diagram of an exemplary embodiment of the transmission system of the present invention embodied in a wireless communication device 500. One skilled in the art will understand that certain functional blocks shown in the figure may not be present in other embodiments of the invention. The block diagram of FIG. 5e corresponds to an embodiment consistent for operation according to the TIA/EIA Standard IS-95C, also referred to as IS-2000, or cdma2000 for CDMA applications. Other embodiments of the present invention are useful for other standards including Wideband CDMA (WCDMA) standards as proposed by the standards bodies ETSI and ARIB. It will be understood by one skilled in the art that owing to the extensive similarity between the reverse link modulation in the WCDMA standards and the reverse link modulation in the IS-95C standard, extension of the present invention to the WCDMA standards may be accomplished.

In the exemplary embodiment of FIG. 5d, the wireless communication device transmits a plurality of distinct channels of information which are distinguished from one another by short orthogonal spreading sequences as described in the U.S. patent application Ser. No. 08/886,604, entitled "HIGH DATA RATE CDMA WIRELESS COMMUNICATION SYSTEM," assigned to the assignee of the present invention and incorporated by reference herein. Five separate code channels are transmitted by the wireless communication device: 1) a first supplemental data channel 532, 2) a time multiplexed channel of pilot and power control symbols 534, 3) a dedicated control channel 536, 4) a second supplemental data channel 538 and 5) a fundamental channel 540. The first supplemental data channel 532 and second supplemental data channel 538 carry digital data which exceeds the capacity of the fundamental channel 540 such as facsimile, multimedia applications, video, electronic mail messages or other forms of digital data. The multiplexed channel of pilot and power control symbols 534 carries pilots symbols to allow for coherent demodulation of the data channels by the base station and power control bits to control the energy of transmissions of the base station or base stations in communication with wireless communication device 500. Control channel 536 carries control information to the base station such as modes of operation of wireless communication device 500, capabilities of wireless communication device 500 and other necessary signaling information. Fundamental channel 540 is the channel used to carry primary information from the wireless communication device to the base station. In the case of speech transmissions, the fundamental channel 540 carries the speech data.

Supplemental data channels 532 and 538 are encoded and processed for transmission by means not shown and provided to modulator 526. Power control bits are provided to repetition generator 522, which provides repetition of the power control bits before providing the bits to multiplexer (MUX) 524. In MUX 524 the redundant power control bits are time multiplexed with pilot symbols and provided on line 534 to modulator 526.

Message generator 512 generates necessary control information messages and provides the control message to CRC and tail bit generator 514. CRC and tail bit generator 514 appends a set of cyclic redundancy check bits which are parity bits used to check the accuracy of the decoding at the base station and appends a predetermined set of tail bits to the control message to clear the memory of the decoder at the base station receiver subsystem. The message is then provided to encoder 516, which provide forward error correction coding upon the control message. The encoded symbols are provided to repetition generator 518, which repeats the encoded symbols to provide additional time diversity in the transmission. The symbols are then provided to interleaver 520 that reorders the symbols in accordance with a predetermined interleaving format. The interleaved symbols are provided on line 536 to modulator 526.

Variable rate data source 502 generates variable rate data. In the exemplary embodiment, variable rate data source 502 is a variable rate speech encoder such as described in U.S. Pat. No. 5,414,796, entitled "VARIABLE RATE VOCODER," assigned to the assignee of the present invention and incorporated by reference herein. Variable rate vocoders are popular in wireless communications because their use increases the battery life of wireless communication devices and increases system capacity with minimal impact on perceived speech quality. The Telecommunications Industry Association has codified the most popular variable rate speech encoders in such standards as IS-96, IS-127, and IS-733. These variable rate speech encoders encode the speech signal at four possible rates referred to as full rate, half rate, quarter rate or eighth rate according to the level of voice activity. The rate indicates the number of bits used to encode a frame of speech and varies on a frame by frame basis. Full rate uses a predetermined maximum number of bits to encode the frame, half rate uses half the predetermined maximum number of bits to encode the frame, quarter rate uses one quarter the predetermined maximum number of bits to encode the frame and eighth rate uses one eighth the predetermined maximum number of bits to encode the frame.

Variable rate date source 502 provides the encoded speech frame to CRC and tail bit generator 504. CRC and tail bit generator 504 appends a set of cyclic redundancy check bits which are parity bits used to check the accuracy of the decoding at the base station and appends a predetermined set of tail bits to the control message in order to clear the memory of the decoder at the base station. The frame is then provided to encoder 506, which provides forward error correction coding on the speech frame. The encoded symbols are provided to repetition generator 508, which provides repetition of the encoded symbol. The symbols are then provided to interleaver 510 and reordered in accordance with a predetermined interleaving format. The interleaved symbols are provided on line 540 to modulator 526.

In the exemplary embodiment, modulator 526 modulates the data channels in accordance with a code division multiple access modulation format and provides the modulated information to transmitter (TMTR) 530, which amplifies and filters the signal and provides the signal through duplexer 528 for transmission through an antenna. In IS-95 and cdma2000 systems, a 20 ms frame is divided into sixteen sets of equal numbers of symbols, referred to as power control groups. The reference to power control is based on the fact that for each power control group, the base station receiving the frame issues a power control command in response to a determination of the sufficiency of the received reverse link signal at the base station.

Figure 5E:
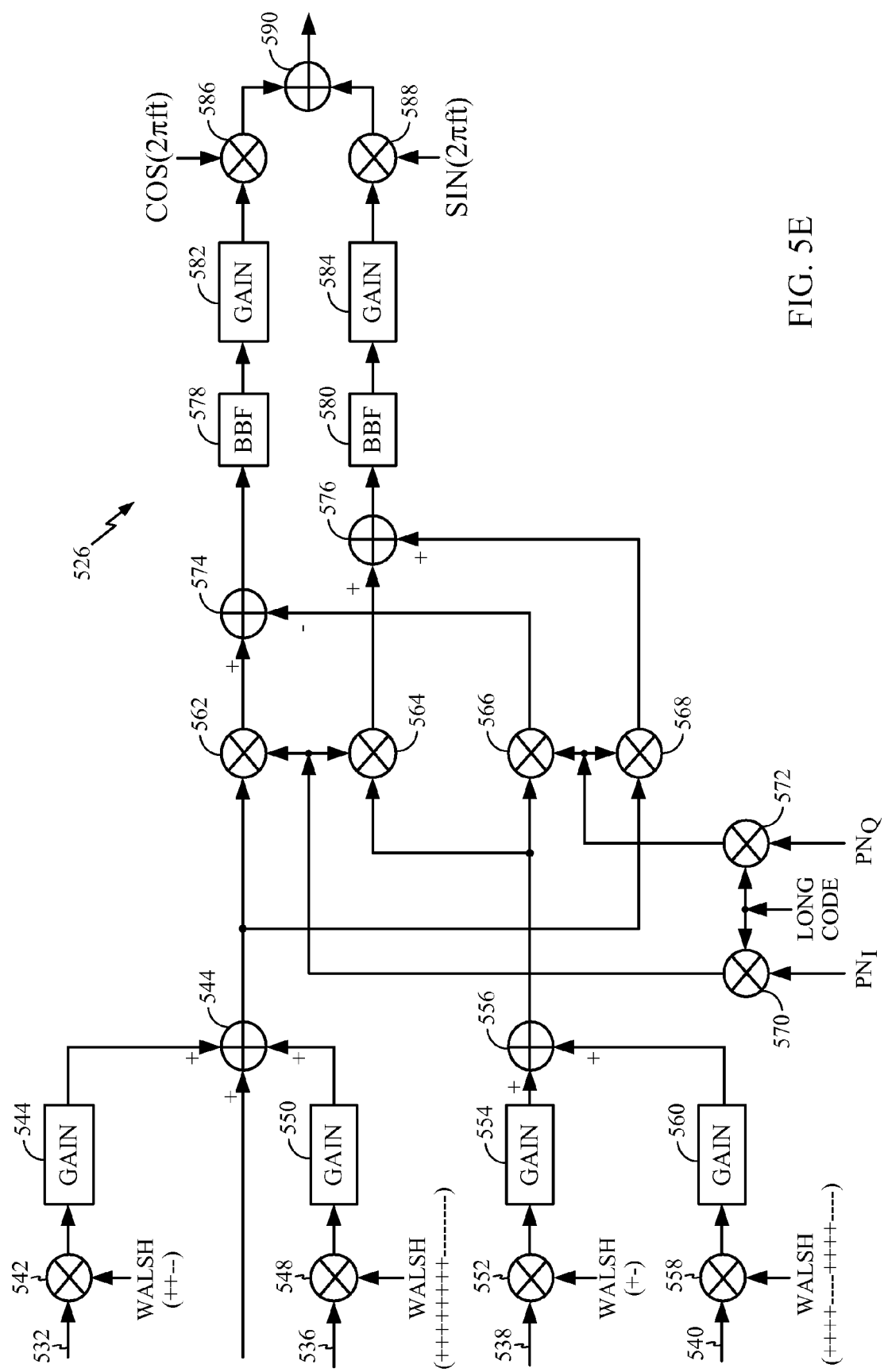
FIG. 5e is a block diagram of the hardware components and interconnections of the modulator 526 shown in FIG. 5d and used in accordance with the invention.

FIG. 5e illustrates a functional block diagram of an exemplary embodiment of modulator 526 of FIG. 5d. The first supplemental data channel data is provided on line 532 to spreading element 542 which covers the supplemental channel data in accordance with a predetermined spreading sequence. In the exemplary embodiment, spreading element 542 spreads the supplemental channel data with a short Walsh sequence (++−−). The spread data is provided to relative gain element 544, which adjusts the gain of the spread supplemental channel data relative to the energy of the pilot and power control symbols. The gain adjusted supplemental channel data is provided to a first summing input of summing element 546. The pilot and power control multiplexed symbols are provided on line 534 to a second summing input of summing element 546.

Control channel data is provided on line 536 to spreading element 548 which covers the supplemental channel data in accordance with a predetermined spreading sequence. In the exemplary embodiment, spreading element 548 spreads the supplemental channel data with a short Walsh sequence (+++++++++--------). The spread data is provided to relative gain element 550, which adjusts the gain of the spread control channel data relative to the energy of the pilot and power control symbols. The gain adjusted control data is provided to a third summing input of summing element 546. Summing element 546 sums the gain adjusted control data symbols, the gain adjusted supplemental channel symbols and the time multiplexed pilot and power control symbols and provides the sum to a first input of multiplier 562 and a first input of multiplier 568.

The second supplemental channel is provided on line 538 to spreading element 552 which covers the supplemental channel data in accordance with a predetermined spreading sequence. In the exemplary embodiment, spreading element 552 spreads the supplemental channel data with a short Walsh sequence (++--). The spread data is provided to relative gain element 554, which adjusts the gain of the spread supplemental channel data. The gain adjusted supplemental channel data is provided to a first summing input of summer 556.

The fundamental channel data is provided on line 540 to spreading element 558 which covers the fundamental channel data in accordance with a predetermined spreading sequence. In the exemplary embodiment, spreading element 558 spreads the fundamental channel data with a short Walsh sequence (++++----++++----). The spread data is provided to relative gain element 560 that adjusts the gain of the spread fundamental channel data. The gain adjusted fundamental channel data is provided to a second summing input of summing element 556. Summing element 556 sums the gain adjusted second supplemental channel data symbols and the fundamental channel data symbols and provides the sum to a first input of multiplier 564 and a first input of multiplier 566.

In the exemplary embodiment, a pseudonoise spreading using two different short PN sequences ($PN_I$ and $PN_Q$) is used to spread the data. In the exemplary embodiment the short PN sequences, $PN_I$ and $PN_Q$, are multiplied by a long PN code to provide additional privacy. The generation of pseudonoise sequences is well known in the art and is described in detail in U.S. Pat. No. 5,103,459, entitled "SYSTEM AND METHOD FOR GENERATING SIGNAL WAVEFORMS IN A CDMA CELLULAR TELEPHONE SYSTEM," assigned to the assignee of the present invention and incorporated by reference herein. A long PN sequence is provided to a first input of multipliers 570 and 572. The short PN sequence $PN_I$ is provided to a second input of multiplier 570 and the short PN sequence $PN_Q$ is provided to a second input of multiplier 572.

The resulting PN sequence from multiplier 570 is provided to respective second inputs of multipliers 562 and 564. The resulting PN sequence from multiplier 572 is provided to respective second inputs of multipliers 566 and 568. The product sequence from multiplier 562 is provided to the summing input of subtractor 574. The product sequence from multiplier 564 is provided to a first summing input of summing element 576. The product sequence from multiplier 566 is provided to the subtracting input of subtractor 574. The product sequence from multiplier 568 is provided to a second summing input of summing element 576.

The difference sequence from subtractor 574 is provided to baseband filter 578. Baseband filter 578 performs necessary filtering on the difference sequence and provides the filtered sequence to gain element 582. Gain element 582 adjusts the gain of the signal and provides the gain-adjusted signal to upconverter 586. Upconverter 586 upconverts the gain adjusted signal in accordance with a QPSK modulation format and provides the unconverted signal to a first input of summing element 590.

The sum sequence from summing element 576 is provided to baseband filter 580. Baseband filter 580 performs necessary filtering on difference sequence and provides the filtered sequence to gain element 584. Gain element 584 adjusts the gain of the signal and provides the gain-adjusted signal to upconverter 588. Upconverter 588 upconverts the gain adjusted signal in accordance with a QPSK modulation format and provides the upconverted signal to a second input of summing element 590. Summing element 590 sums the two QPSK modulated signals and provides the result to a transmitter (not shown).

Figure 6A:
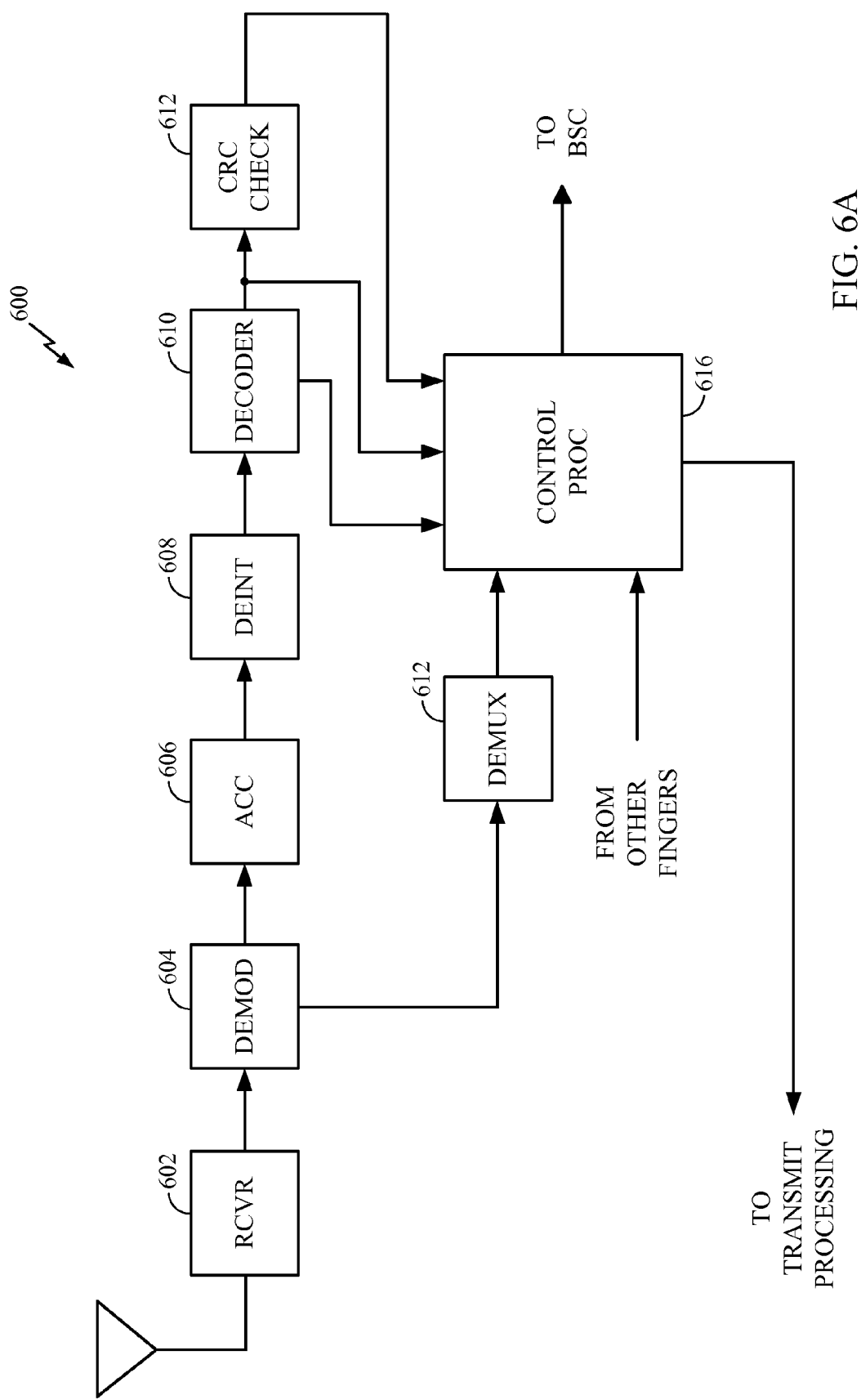
FIG. 6a is a block diagram of a portion of the hardware components and interconnections of a digital signal processing base station apparatus used in accordance with the invention.

Turning now to FIG. 6a, a functional block diagram of selected portions of a base station 600 in accordance with the present invention. Reverse link RF signals from the wireless communication device 500 (FIG. 5e) are received by receiver (RCVR) 602, which downconverts the received reverse link RF signals to an baseband frequency. In the exemplary embodiment, receiver 602 down converts the received signal in accordance with a QPSK demodulation format. Demodulator 604 then demodulates the baseband signal, and in one embodiment, provides it to accumulator 606 and despreader 613. Demodulator 604 is further described with reference to FIG. 6b below.

The demodulated signal is provided to accumulator 606. Accumulator 606 sums the symbol energies of the redundantly transmitted power control groups of symbols. The accumulated symbol's energies are provided to de-interleaver 608 and reordered in accordance with a predetermined de-interleaving format. The reordered symbols are provided to decoder 610 and decoded to provide an estimate of the transmitted frame. The estimate of the transmitted frame is then provided to CRC check 612 which determines the accuracy of the frame estimate based on the CRC bits included in the transmitted frame.

In the exemplary embodiment, base station 600 performs a blind decoding on the reverse link signal. Blind decoding describes a method of decoding variable rate data in which the receiver does not know a priori the rate of the transmission. In the exemplary embodiment, base station 600 accumulates, deinterleaves and decodes the data in accordance with each possible rate hypothesis. The frame selected as the best estimate is based on quality metrics such as the symbol error rate, the CRC check and the Yamamoto metric.

An estimate of the frame for each rate hypothesis is provided to control processor 15 by despreader 613 and a set of quality metrics for each of the decoded estimates is also provided. Quality metrics that may include the symbol error rate, the Yamamoto metric and the CRC check. Control processor selectively provides one of the decoded frames to the remote station user or declares a frame erasure.

Figure 6B:
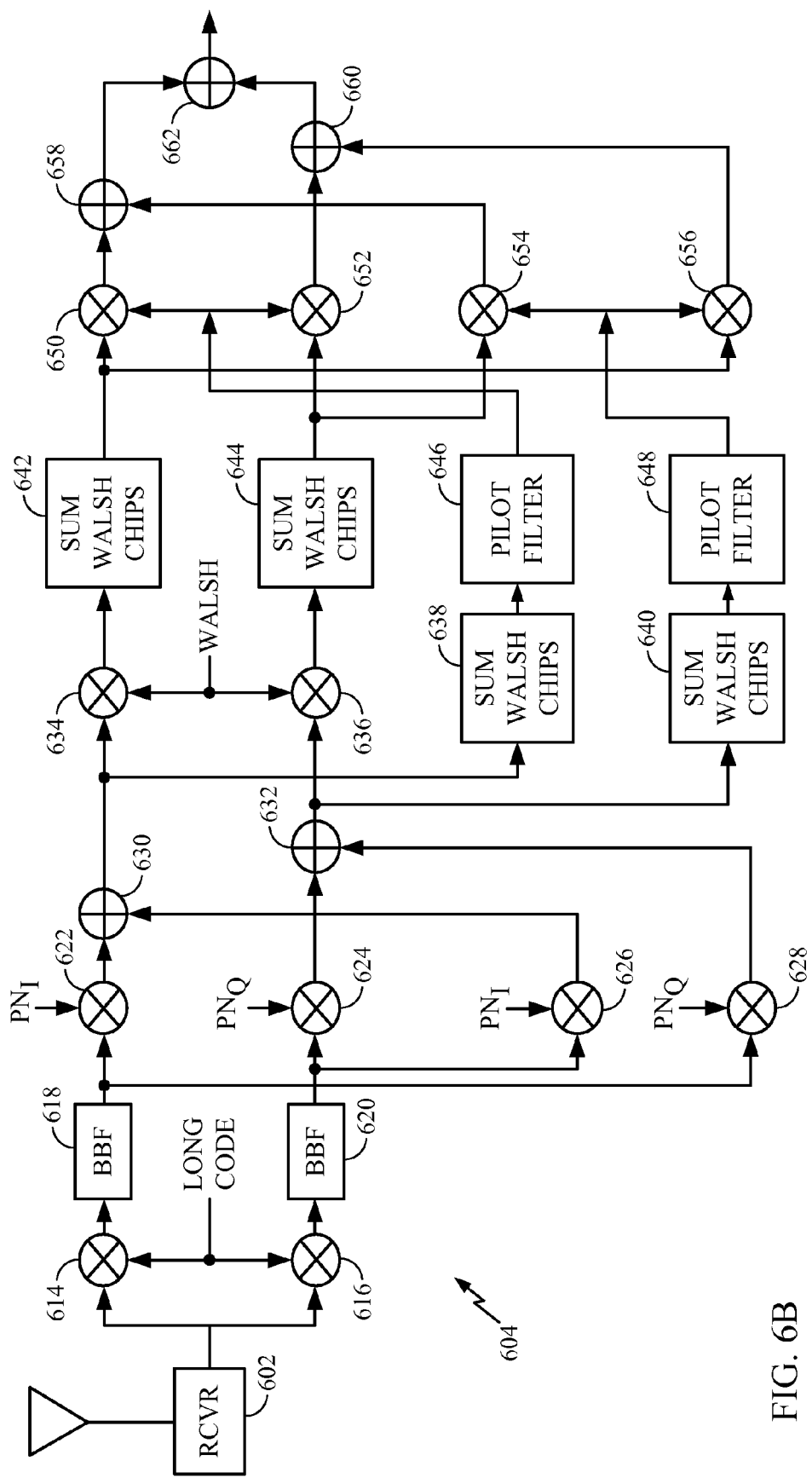
FIG. 6b is a block diagram of the hardware components and interconnections of the demodulator 604 shown in FIG. 6a and used in accordance with the invention.

An expanded functional block diagram of an exemplary single demodulation chain of demodulator 604 is shown in FIG. 6b. In the preferred embodiment, demodulator 604 has one demodulation chain for each information channel. The exemplary demodulator 604 of FIG. 6b performs complex demodulation on signals modulated by the exemplary modulator 604 of FIG. 6a. As previously described, receiver (RCVR) 602 downconverts the received reverse link RF signals to a baseband frequency, producing Q and I baseband signals. Despreaders 614 and 616 respectively despread the I and Q baseband signals using the long code from FIG. 5d. Baseband filters (BBF) 618 and 620 respectively filter the I and Q baseband signals.

Despreaders 622 and 624 respectively despread the I and Q signals using the $PN_I$ sequence of FIG. 5e. Similarly, despreaders 626 and 628 respectively despread the Q and I signals using the $PN_Q$ sequence of FIG. 5e. The outputs of despreaders 622 and 624 are combined in combiner 630. The output of despreader 628 is subtracted from the output of despreader 624 in combiner 632. The respective outputs of combiners 630 and 632 are then Walsh-uncoverers in Walsh-uncoverers 634 and 636 with the Walsh code that was used to cover the particular channel of interest in FIG. 5e. The respective outputs of the Walsh-uncoverers 634 and 636 are then summed over one Walsh symbol by accumulators 642 and 644.

The respective outputs of combiners 630 and 632 are also summed over one Walsh symbol by accumulators 638 and 640. The respective outputs of accumulators 638 and 640 are then applied to pilot filters 646 and 648. Pilot filters 646 and 648 generate an estimation of the channel conditions by determining the estimated gain and phase of the pilot signal data 534 (see FIG. 5d). The output of pilot filter 646 is then complex multiplied by the respective outputs of accumulators 642 and 644 in complex multipliers 650 and 652. Similarly, the output of pilot filter 648 is complex multiplied by the respective outputs of accumulators 642 and 644 in complex multipliers 654 and 656. The output of complex multiplier 654 is then summed with the output of complex multiplier 650 in combiner 658. The output of complex multiplier 656 is subtracted from the output of complex multiplier 652 in combiner 660. Finally, the outputs of combiners 658 and 660 are combined in combiner 662 to produce the demodulated signal of interest.

FIG. 7 compares the spectrum of a 1× reverse link spectrum to a 3× reverse link spectrum.

Despite the specific foregoing descriptions, ordinarily skilled artisans having the benefit of this disclosure will recognize that the apparatus discussed above may be implemented in a machine of different construction without departing from the scope of the present invention. Similarly, parallel methods may be developed. As a specific apparatus example, one of the components such as summing element 622, shown in FIG. 6b, may be combined with summing element 626 even though they are shown as separate elements in the functional diagram.

OTHER EMBODIMENTS

While there have been shown what are presently considered to be preferred embodiments of the invention, it will be apparent to those skilled in the art that various changes and modifications can be made without departing from the scope of the invention as defined by the appended claims.

What is claimed is:

1. A method in a wireless communication system, comprising:
   designating a multi-carrier forward link having a plurality of forward link frequency bins allocated to carry different types of payload data; and
   designating a reverse link having at least one reverse link frequency bin, wherein the designation is responsive to loading and wherein the forward link frequency bins and the at least one reverse link frequency bin are designated such that bandwidth of the forward link can be allocated differently from the bandwidth of the reverse link, and further wherein the forward link frequency bins and the at least one reverse link frequency bin comprise signals obtained by code spreading in the time domain, and further wherein each of the forward link bins and the at least one reverse link frequency bin are allocated for single-carrier CDMA communication within the respective bin.

2. The method of claim 1 further comprising:
   selecting a first forward link frequency bin from the plurality of forward link frequency bins for forward link transmission, the first forward link frequency bin having an associated first reverse link frequency bin; and
   selecting a second reverse link frequency bin for reverse link transmission corresponding to the forward link transmission wherein the second reverse link frequency bin is different from the first reverse link frequency bin.

3. The method of claim 2 wherein the selecting a second reverse link frequency bin is based on loading of the system.

4. The method of claim 2, further comprising:
   selecting a third reverse link frequency bin for reverse link transmission corresponding to the forward link transmission, wherein the third reverse link frequency bin is different from the first and second reverse link frequency bins.

5. The method of claim 1, wherein said plurality of forward link frequency bins comprise three frequency bins.

6. The method of claim 1, wherein said plurality of forward link frequency bins are adjacent frequency bins.

7. The method of claim 2, wherein said multi-carrier forward link is adapted for transmission of a plurality of code channels, wherein one of said plurliayt of code channels is used to communicate power control information for said second reverse link frequency bin.

8. The method of claim 1, wherein the designations of the forward and reverse link includes allocating more bandwidth for the forward link than the reverse link.

9. The method of claim 1, wherein the designation of the forward link includes configuring the forward link as a cdma2000 3× forward link.

10. The method of claim 9, wherein the forward link includes first, second, and third carriers.

11. The method of claim 10, wherein said first, second, and third carriers occupy first, second, and third adjacent frequency bins, respectively.

12. The method of claim 11, wherein the designation of the reverse link includes configuring the reverse link as a cdma2000 1× reverse link.

13. The method of claim 12, wherein the reverse link includes a fourth carrier.

14. The method of claim 13, wherein the fourth carrier is located in a frequency range similar to the second frequency bin.

15. The method of claim 1, wherein forward link data is allocated to each of the forward link frequency bins depending on a data type of the forward link data.

16. A method of allocating bandwidth for forward and reverse link transmissions in a wireless communication system, comprising:
   receiving communications on a multi-carrier forward link, the multi-carrier forward link having a plurality of forward link frequency bins allocated to carry different types of payload data, the reverse link having at least one frequency bin, wherein the at least one frequency bin of the reverse link is selected responsive to loading;
   wherein the forward link bins and the at least one reverse link frequency bins are configured such that the allocation of bandwidth for the forward and reverse link transmissions can be varied, and further wherein the forward link frequency bins and the at least one reverse link frequency bin comprise signals obtained by code spreading in the time domain, and further wherein each of the forward link bins and the at least one reverse link frequency bin are allocated for single-carrier CDMA communication within the respective bin.

17. The method of claim 16, further comprising:
receiving by a first device a communication on a forward link frequency bin, the forward link frequency bin having an associated first reverse link frequency bin; and
transmitting by a second device via a second reverse link frequency bin, wherein said second reverse link frequency bin is different from the first reverse link frequency bin.

18. The method of claim 17, further comprising:
receiving by the first device an indication of a reverse link frequency bin.

19. An apparatus in a wireless communication system, comprising:
a first means for transmitting information on a multi-carrier forward link, wherein said multi-carrier forward link comprises a plurality of forward link frequency bins allocated to carry different types of payload data; and
a second means for designating a reverse link frequency bin, wherein the designation is responsive to loading, and further wherein said first and second means configure the frequency bins so as to enable differential allocation of bandwidth for forward link and reverse link transmissions, and further wherein the forward link frequency bins and the at least one reverse link frequency bin comprise signals obtained by code spreading in the time domain, and further wherein each of the forward link bins and the at least one reverse link frequency bin are allocated for single-carrier CDMA communication within the respective bin.

20. The apparatus of claim 19, further comprising:
means for selecting a first forward link frequency bin from the plurality of forward link frequency bins for the forward link transmission, the first forward link frequency bin having an associated first reverse link frequency bins; and
means for selecting a second reverse link frequency bin for the reverse link transmission corresponding to the forward link transmission, wherein the second reverse link frequency bin is different from the first reverse link frequency bin.

21. A method in a wireless communication system, comprising:
designating a multi-carrier forward link having a plurality of forward link frequency bins allocated to carry different types of payload data; and
designating a reverse link having a plurality of reverse link frequency bins, wherein the designation is responsive to loading, and further wherein a subset of the reverse link frequency bins are time-division-duplexed, wherein the forward link frequency bins and the reverse link frequency bins are designated such that bandwidth of the forward link can be allocated differently from bandwidth of the reverse link, and further wherein the forward link frequency bins and the reverse link frequency bins comprise signals obtained by code spreading in the time domain.

22. A method in a wireless communication system, comprising:
designating a multi-carrier forward link having a plurality of forward link frequency bins allocated to carry different types of payload data; and
designating a reverse link having at least one reverse link frequency bin, wherein the designation is responsive to loading and wherein the forward link frequency bins and the at least one reverse link frequency bin are designated such that bandwidth of the forward link can be allocated differently from bandwidth of the reverse link.

23. The method of claim 22 further comprising:
selecting a first forward link frequency bin from the plurality of forward link frequency bins for forward link transmission, the first forward link frequency bin having an associated first reverse link frequency bin; and
selecting a second reverse link frequency bin for reverse link transmission corresponding to the forward link transmission wherein the second reverse link frequency bin is different from the first reverse link frequency bin.

24. A method of allocating bandwidth for forward and reverse link transmissions in a wireless communication system, comprising:
receiving communications on a multi-carrier forward link, the multi-carrier forward link having a plurality of forward link frequency bins allocated to carry different types of payload data, the reverse link having at least one frequency bin, wherein the at least one frequency bin of the reverse link is selected responsive to loading;
wherein the forward link bins and the at least one reverse link frequency bins are configured such that the allocation of bandwidth for the forward and reverse link transmissions can be varied.

25. The method of claim 24 further comprising:
transmitting communications over the at least one frequency bin of the reverse link.

26. The method of claim 25, further comprising:
receiving an indication of a reverse link frequency bin.

27. An apparatus in a wireless communication system comprising:
means for designating a multi-carrier forward link having a plurality of forward link frequency bins allocated to carry different types of payload data; and
means for designating a reverse link having at least one reverse link frequency bin, wherein the designation is responsive to loading and wherein the forward link frequency bins and the at least one reverse link frequency bin are designated such that bandwidth of the forward link can be allocated differently from bandwidth of the reverse link.

28. The apparatus of claim 27 further comprising:
means for selecting a first forward link frequency bin from the plurality of forward link frequency bins for forward link transmission, the first forward link frequency bin having an associated first reverse link frequency bin; and
means for selecting a second reverse link frequency bin for reverse link transmission corresponding to the forward link transmission wherein the second reverse link frequency bin is different from the first reverse link frequency bin.

29. An apparatus in a wireless communications system comprising:
means for receiving communications on a multi-carrier forward link, the multi-carrier forward link having a plurality of forward link frequency bins allocated to carry different types of payload data, the reverse link having at least one frequency bin, wherein the at least one frequency bin of the reverse link is selected responsive to loading, wherein the forward link bins and the at least one reverse link frequency bins are configured such that the allocation of bandwidth for the forward and reverse link transmissions can be varied; and
means for transmitting communications over the at least one frequency bin of the reverse link.

30. The apparatus of claim 29 further comprising:
  means for receiving an indication of a reverse link frequency bin.

31. A non-transitory computer-readable medium including computer-executable instructions comprising:
  a first set of instructions for designating a multi-carrier forward link having a plurality of forward link frequency bins allocated to carry different types of payload data; and
  a second set of instructions for designating a reverse link having at least one reverse link frequency bin, wherein the designation is responsive to loading and wherein the forward link frequency bins and the at least one reverse link frequency bin are designated such that bandwidth of the forward link can be allocated differently from bandwidth of the reverse link.

32. The non-transitory computer-readable medium of claim 31 further comprising:
  a third set of instructions for selecting a first forward link frequency bin from the plurality of forward link frequency bins for forward link transmission, the first forward link frequency bin having an associated first reverse link frequency bin; and
  a fourth set of instructions for selecting a second reverse link frequency bin for reverse link transmission corresponding to the forward link transmission wherein the second reverse link frequency bin is different from the first reverse link frequency bin.

33. A non-transitory computer-readable medium including computer-executable instructions comprising:
  a first set of instructions for receiving communications on a multi-carrier forward link, the multi-carrier forward link having a plurality of forward link frequency bins allocated to carry different types of payload data, the reverse link having at least one frequency bin, wherein the at least one frequency bin of the reverse link is selected responsive to loading;
  wherein the forward link bins and the at least one reverse link frequency bins are configured such that the allocation of bandwidth for the forward and reverse link transmissions can be varied.

34. The non-transitory computer-readable medium of claim 33 further comprising:
  a second set of instructions for transmitting communications over the at least one frequency bin of the reverse link.

35. The non-transitory computer-readable medium of claim 34 further comprising:
  a third set of instructions for receiving an indication of a reverse link frequency bin.

\* \* \* \* \*